US012661612B2

(12) United States Patent
Ito et al.

(10) Patent No.: US 12,661,612 B2
(45) Date of Patent: Jun. 23, 2026

(54) CARBON DIOXIDE RECOVERY SYSTEM

(71) Applicant: DENSO CORPORATION, Kariya-city (JP)

(72) Inventors: Takamasa Ito, Kariya-city (JP); Hiroaki Umeda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 297 days.

(21) Appl. No.: 18/306,346

(22) Filed: Apr. 25, 2023

(65) Prior Publication Data

US 2023/0285890 A1 Sep. 14, 2023

Related U.S. Application Data

(63) Continuation of application No. PCT/JP2021/037998, filed on Oct. 14, 2021.

(30) Foreign Application Priority Data

Nov. 20, 2020 (JP) ................................. 2020-192924

(51) Int. Cl.
    B01D 53/053 (2006.01)
    C01B 32/50 (2017.01)
(52) U.S. Cl.
    CPC ............ B01D 53/053 (2013.01); C01B 32/50 (2017.08); B01D 2253/204 (2013.01);
    (Continued)
(58) Field of Classification Search
    CPC ............ B01D 53/053; B01D 2253/204; B01D 2257/504; B01D 2258/01; B01D 2258/06;
    (Continued)

(56) References Cited

U.S. PATENT DOCUMENTS 3,685,256 A * 8/1972 Barrere, Jr. ............ B01D 53/04
                                                          95/143
4,784,672 A 11/1988 Sircar
                   (Continued)

FOREIGN PATENT DOCUMENTS

CN       102091500 A    6/2011
EP        3449996 A1    3/2019
                   (Continued)

OTHER PUBLICATIONS

Okada, translation WO2019049629, 2019 (Year: 2019).*
Akio, translation JP2009269805, 2009 (Year: 2009).*

*Primary Examiner* — Amber R Orlando
(74) *Attorney, Agent, or Firm* — Harness, Dickey & Pierce, PLC

(57) ABSTRACT

A carbon dioxide recovery system includes: an adsorber configured to adsorb and desorb carbon dioxide; a supply channel through which supply gas passes; a storage section configured to store carbon dioxide desorbed from the adsorber; and a gas supply section supplying carbon dioxide stored in the storage section to the adsorber. The carbon dioxide recovery system is operated in an adsorption mode, a desorption mode or in a desorption preparation mode. In the adsorption mode, the adsorber adsorbs $CO_2$ contained in the supply gas supplied through the supply channel. In the desorption mode, the adsorber desorbs the adsorbed $CO_2$, and the storage section stores $CO_2$ desorbed from the adsorber. In the desorption preparation mode, the gas supply section supplies $CO_2$ stored in the storage section to the adsorber during a time from an end of the adsorption mode to a start of the desorption mode.

11 Claims, 14 Drawing Sheets

(52) U.S. Cl.
CPC .... *B01D 2257/504* (2013.01); *B01D 2258/01* (2013.01); *B01D 2258/06* (2013.01); *B01D 2259/40003* (2013.01); *B01D 2259/40009* (2013.01); *C01B 2210/0014* (2013.01)

(58) Field of Classification Search
CPC .......... B01D 2259/40003; B01D 2259/40009; C01B 32/50; C01B 2210/0014
See application file for complete search history.

(56) References Cited

U.S. PATENT DOCUMENTS

| | | | |
|---|---|---|---|
| 5,429,664 A | 7/1995 | Lee | |
| 2009/0260518 A1* | 10/2009 | Wright | B01D 53/0462 96/111 |
| 2010/0095841 A1* | 4/2010 | Naheiri | B01D 53/0476 95/96 |
| 2020/0306686 A1 | 10/2020 | Joss et al. | |

FOREIGN PATENT DOCUMENTS

| | | | | |
|---|---|---|---|---|
| JP | 2008174407 A | 7/2008 | | |
| JP | 2009269805 A | 11/2009 | | |
| JP | 6575050 B2 | 9/2019 | | |
| WO | WO-2019049629 A1 * | 3/2019 | | B01D 53/22 |

* cited by examiner

CARBON DIOXIDE RECOVERY SYSTEM

CROSS REFERENCE TO RELATED APPLICATIONS

The present application is a continuation Applications of International Patent Application No. PCT/JP2021/037998 filed on Oct. 14, 2021, which designated the U.S. and claims the benefit of priority from Japanese Patent Application No. 2020-192924 filed on Nov. 20, 2020. The entire disclosures of all of the above applications are incorporated herein by reference.

TECHNICAL FIELD

The present disclosure relates to a carbon dioxide recovery system that recovers $CO_2$ from $CO_2$-containing gases.

BACKGROUND

Conventionally, an apparatus separates $CO_2$ from a $CO_2$-containing gas by utilizing the fact that an adsorbent provided in an adsorption section adsorbs or desorbs $CO_2$ in accordance with a pressure variation.

SUMMARY

According to an aspect of the present disclosure, a carbon dioxide recovery system of the present disclosure includes an adsorber, a supply channel, a storage section, and a gas supply section. The carbon dioxide recovery system is configured to set an adsorption mode, a desorption mode, and a desorption preparation mode. The adsorber is configured to adsorb or desorb $CO_2$. The supply gas passes through the supply channel, and the storage section stores the $CO_2$ desorbed from the adsorber. The gas supply section supplies the $CO_2$ stored in the storage section to the adsorber.

In the adsorption mode, the adsorber adsorbs $CO_2$ contained in the supply gas supplied through the supply channel. In the desorption mode, the adsorber desorbs the adsorbed $CO_2$, and the storage section stores $CO_2$ desorbed from the adsorber. In the desorption preparation mode, the gas supply section supplies the $CO_2$ stored in the storage section to the adsorber during a time from an end of the adsorption mode to a start of the desorption mode.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
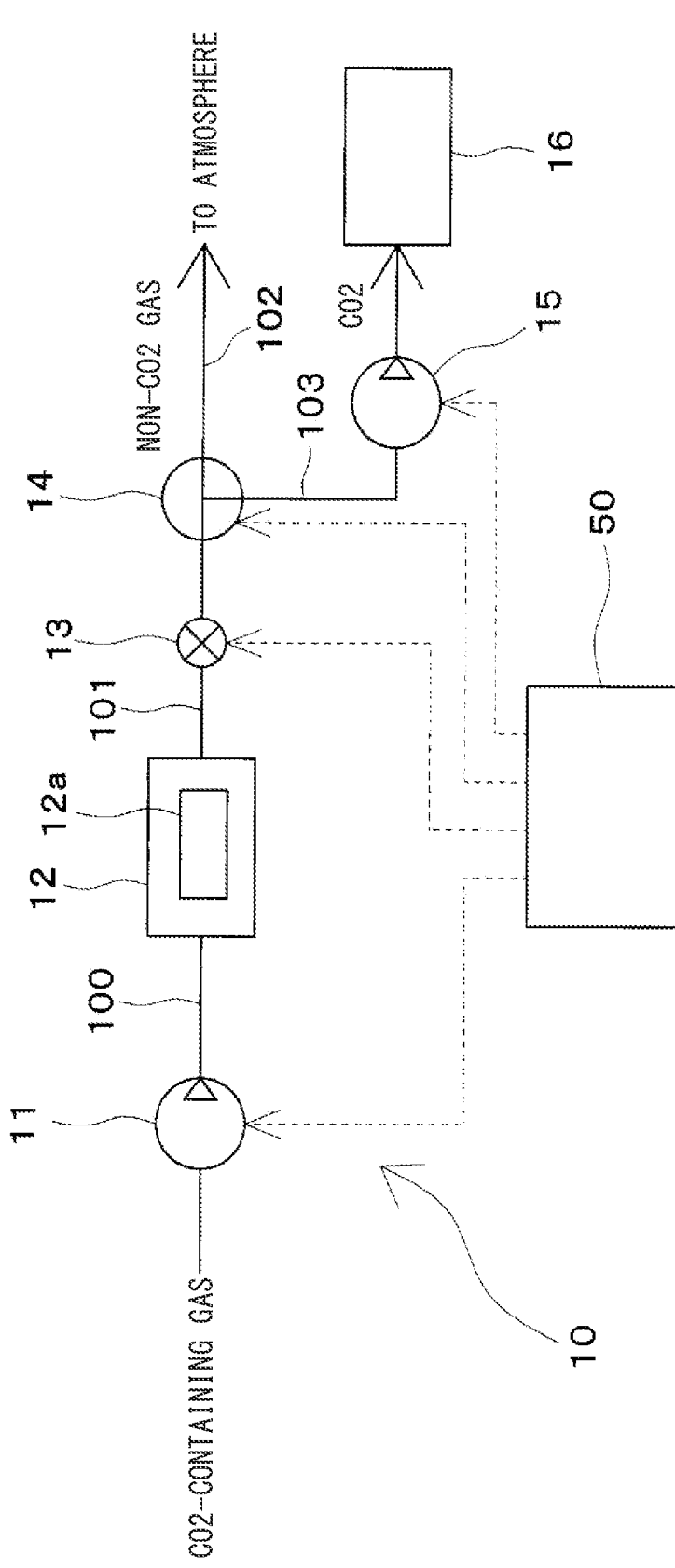
FIG. 1 is a diagram showing a configuration of a carbon dioxide recovery system according to a first embodiment.

In a carbon dioxide recovery system of a comparative example, $CO_2$ is recovered when a concentration of $CO_2$ desorbed from an adsorbent is equal to or higher than a predetermined concentration. When the concentration of $CO_2$ desorbed from the adsorbent is less than the predetermined concentration, $CO_2$ is returned through a return channel to the adsorber, so as to recover a high-concentration $CO_2$.

The carbon dioxide recovery system recovers $CO_2$ by switching between adsorption and desorption of $CO_2$. In this case, gases other than $CO_2$ may remain in the adsorber or piping during $CO_2$ adsorption, and gases other than $CO_2$ may be adsorbed by the adsorber at the same time as adsorbing $CO_2$. Thus, the concentration of $CO_2$ to be recovered may lower because gases other than $CO_2$ are recovered together with $CO_2$ when recovering $CO_2$.

When the desorbed $CO_2$ is equal to or lower than a predetermined concentration, it is returned to the adsorption section to increase the concentration of the $CO_2$ to be recovered. In order to obtain a high concentration of $CO_2$ with such a configuration, it is necessary to reduce the pressure inside the adsorption section excessively in order to remove gases other than $CO_2$ from the adsorption section. In this case, the adsorbed $CO_2$ may be desorbed, resulting in a drop of recovery amount.

Further, in the carbon dioxide recovery system, in order to reflux the desorbed $CO_2$ to the adsorber when the desorbed $CO_2$ is equal to or lower than a predetermined concentration, it is necessary to add a reflux channel and a compressor, and thereby complicating the apparatus.

It is an object of the present disclosure to improve a concentration of recovered $CO_2$ with a simple configuration in a carbon dioxide recovery system that recovers $CO_2$ from a $CO_2$-containing gas.

In order to achieve the above object, a carbon dioxide recovery system of the present disclosure includes an adsorber, a supply channel, a storage section, and a gas supply section. The carbon dioxide recovery system is configured to set an adsorption mode, a desorption mode, and a desorption preparation mode. The adsorber is configured to adsorb or desorb $CO_2$. The supply gas passes through the supply channel, and the storage section stores the $CO_2$ desorbed from the adsorber. The gas supply section supplies the $CO_2$ stored in the storage section to the adsorber.

In the adsorption mode, the adsorber adsorbs $CO_2$ contained in the supply gas supplied through the supply channel. In the desorption mode, the adsorber desorbs the adsorbed $CO_2$, and the storage section stores $CO_2$ desorbed from the adsorber. In the desorption preparation mode, the gas supply section supplies the $CO_2$ stored in the storage section to the adsorber during a time from an end of the adsorption mode to a start of the desorption mode.

In such manner, in the desorption preparation mode, the non-$CO_2$ gas remaining in the adsorber after the end of the adsorption mode can be replaced with $CO_2$, and thereby high-concentration $CO_2$ can be recovered in the desorption mode. In such manner, the concentration of $CO_2$ recovered in the desorption mode can be improved with a simple configuration.

The following describes embodiments for carrying out the present disclosure with reference to the drawings. In each of the embodiments, parts/configurations corresponding to the elements described in the preceding embodiments are denoted by the same reference numerals, and redundant explanation may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

The first embodiment of the present disclosure will be described below with reference to the drawings.

As shown in FIG. 1, a carbon dioxide recovery system 10 of the present embodiment includes a first gas supply section 11, an adsorber 12, a throttle valve 13, a channel switch valve 14, a second gas supply section 15, and a storage section 16. These devices are connected by gas channels 100 to 103. The gas supply sections 11 and 15 and the throttle valve 13 correspond to a pressure adjuster that adjusts a $CO_2$ partial pressure inside the adsorber 12.

The gas channels 100 to 103 are gas pipes through which gas can pass. The gas channels 100 to 103 include a supply channel 100, a discharge channel 101, an outlet channel 102 and a recovery channel 103.

In the present embodiment, a flow direction of the gas flowing from the supply channel 100 through the discharge channel 101 toward the outlet channel 102 or the recovery channel 103 is defined as a forward flow direction, and a flow direction of the gas flowing from the recovery channel 103 through the discharge channel 101 toward the supply channel 100 is defined as a reverse flow direction. The forward flow direction and the reverse flow direction are opposite directions of gas flow, and an upstream in the forward flow direction corresponds to a downstream in the reverse flow direction, and the downstream in the forward flow direction corresponds to the upstream in the reverse flow direction. In the specification, the terms "upstream" and "downstream" is used to mean "upstream in the forward flow direction" and "downstream in the forward flow direction."

A supply gas supplied to the adsorber 12 passes through the supply channel 100. The supply gas contains $CO_2$ and non-$CO_2$ gases other than $CO_2$, and can be, for example, an exhaust gas of an internal-combustion engine or the atmosphere.

A first gas supply section 11 is provided in the supply channel 100. The first gas supply section 11 is a compressor that pressurizes the supply gas and supplies it to the adsorber 12. The supply gas supplied by the first gas supply section 11 flows through the supply channel 100 in the forward flow direction toward the adsorber 12.

The adsorber 12 is provided downstream of the first gas supply section 11 in the supply channel 100. The adsorber 12 is a device that adsorbs and separates $CO_2$ from the supply gas. The adsorber 12 introduces the supply gas into the inside, and discharges (i) the remaining non-$CO_2$ gas from which $CO_2$ has been separated from the supply gas, or (ii) the $CO_2$ that has been separated from the supply gas.

Inside the adsorber 12, an adsorbent 12a capable of adsorbing $CO_2$ is provided. The adsorbent 12a adsorbs $CO_2$ contained in the supply gas under predetermined adsorption conditions, and desorbs the adsorbed $CO_2$ under desorption conditions different from the adsorption conditions. The $CO_2$ desorbed from the adsorber 12 is also called desorbed gas.

The adsorbent 12a of the present embodiment uses a material that adsorbs and desorbs $CO_2$ by pressure variation, and the adsorption conditions and desorption conditions are different pressures. The $CO_2$ adsorption amount of the adsorbent 12a varies according to the $CO_2$ partial pressure, and the $CO_2$ adsorption amount increases as the $CO_2$ partial pressure increases. By making the $CO_2$ partial pressure in the adsorber 12 relatively high, $CO_2$ can be adsorbed by the adsorbent 12a. By making the $CO_2$ partial pressure in the adsorber 12 relatively low, $CO_2$ can be desorbed from the adsorbent 12a.

The carbon dioxide recovery system of the present embodiment has multiple operation modes, including (i) an adsorption mode in which $CO_2$ is adsorbed by the adsorber 12, (ii) a desorption mode in which $CO_2$ is desorbed from the adsorber 12, and (iii) a desorption preparation mode for preparation of desorption of $CO_2$ in the adsorber 12. These operation modes are described later.

In the present embodiment, a metal-organic composite (MOF) is used as the adsorbent 12a. A metal-organic composite has a porous structure in which an organic ligand is coordinate-bonded to a metal ion. The metal-organic composite used as the adsorbent 12a may have an adsorption property for $CO_2$, which may be, for example, [Cu(4,4'-dihydroxybiphenyl-3-carboxyl)$_2$(4,4'-bipyridyl)]n, [Cu(PF$_6^-$)$_2$(1,2-bis(4-pyridyl)ethane)]n, [Cu(CF$_3$SO$_3^-$)$_2$(1,3-bis(4-pyridyl)propane)$_2$]$_n$, {[Cu(PF$_6^-$)(2,2-bis(4-pyridyl))] PF$_6^-$}$_n$ and the like.

The discharge channel 101 is connected to a downstream side of the adsorber 12. The non-$CO_2$ gas or $CO_2$ discharged from the adsorber 12 passes through the discharge channel 101.

The throttle valve 13 is provided in the discharge channel 101. The throttle valve 13 has a variable throttle mechanism capable of adjusting the degree of valve opening, and can change the gas pressure inside the adsorber 12 by adjusting the channel area. When the first gas supply section 11 pressurizes and supplies the supply gas, the gas pressure inside the adsorber 12 can be increased by reducing the opening degree of the throttle valve 13. On the other hand, by increasing the opening degree of the throttle valve 13, the gas pressure inside the adsorber 12 can be reduced.

The discharge channel 101 is branched into the outlet channel 102 and the recovery channel 103 on a downstream side of the discharge channel 101. The channel switch valve 14 is provided at a connection point of the discharge channel 101, the outlet channel 102 and the recovery channel 103. The channel switch valve 14 is a three-way valve that switches between (i) a state in which the discharge channel 101 and the outlet channel 102 communicate with each other and (ii) a state in which the discharge channel 101 and the recovery channel 103 communicate with each other. The channel switch valve 14 allows communication of the discharge channel 101 and the outlet channel 102 in the adsorption mode, and allows communication of the discharge channel 101 and the recovery channel 103 in the desorption preparation mode and the desorption mode.

The outlet channel 102 communicates with the atmosphere. The non-$CO_2$ gas discharged from the adsorber 12 is released to the atmosphere through the outlet channel 102.

The recovery channel 103 is connected to the storage section 16. The second gas supply section 15 is provided in the recovery channel 103. The second gas supply section 15 sucks $CO_2$ discharged from the adsorber 12 and supplies it to the storage section 16. $CO_2$ discharged from the adsorber 12 is supplied to the storage section 16 via the recovery channel 103.

A blower or a compressor or the like can be used as the second gas supply section 15. The storage section 16 is a device that stores $CO_2$ separated from the supply gas by the adsorber 12. In the present embodiment, a high-pressure tank for storing high-pressure $CO_2$ is used as the storage section 16, and a compressor for pressurizing $CO_2$ and for supplying it to the storage section 16 is used as the second gas supply section 15.

The second gas supply section 15 of the present embodiment can supply gas not only in the forward flow direction from the supply section 12 to the storage section 16, but also in the reverse flow direction from the storage section 16 to the supply section 12. Gas supplied in the reverse flow direction may also be referred to as a reverse flow gas.

The second gas supply section 15 supplies, in the desorption mode, $CO_2$ desorbed from the adsorber 12 in the forward flow direction toward the storage section 16, and supplies, in the desorption preparation mode, $CO_2$ stored in the storage section 16 in the reverse flow direction toward the adsorber 12. The second gas supply section 15 may be configured as a single device used for both of the forward flow and reverse flow, or two devices used separately for the forward flow and reverse flow. When the second gas supply section 15 is configured as two devices used separately for the forward flow and reverse flow, the two devices may be connected in parallel and one device may be bypassed when the other device is in operation.

A controller 50 is provided in the carbon dioxide recovery system 10. The controller 50 includes a known microcomputer including CPU, ROM and RAM, and peripheral circuits. The controller 50 performs various calculations and processes based on control programs stored in the ROM, and controls operations of various control target devices. The controller 50 outputs control signals to the gas supply sections 11 and 15, the throttle valve 13, and the channel switch valve 14 to control the operation of the gas supply sections 11 and 15, the opening control of the throttle valve 13, and the channel switching control of the channel switch valve 14.

Next, the operation of the carbon dioxide recovery system 10 configured as described above will be described. As described above, the carbon dioxide recovery system 10 of the present embodiment has multiple operation modes.

Execution and switching of these operation modes are performed under the control of the controller 50.

Figure 2:
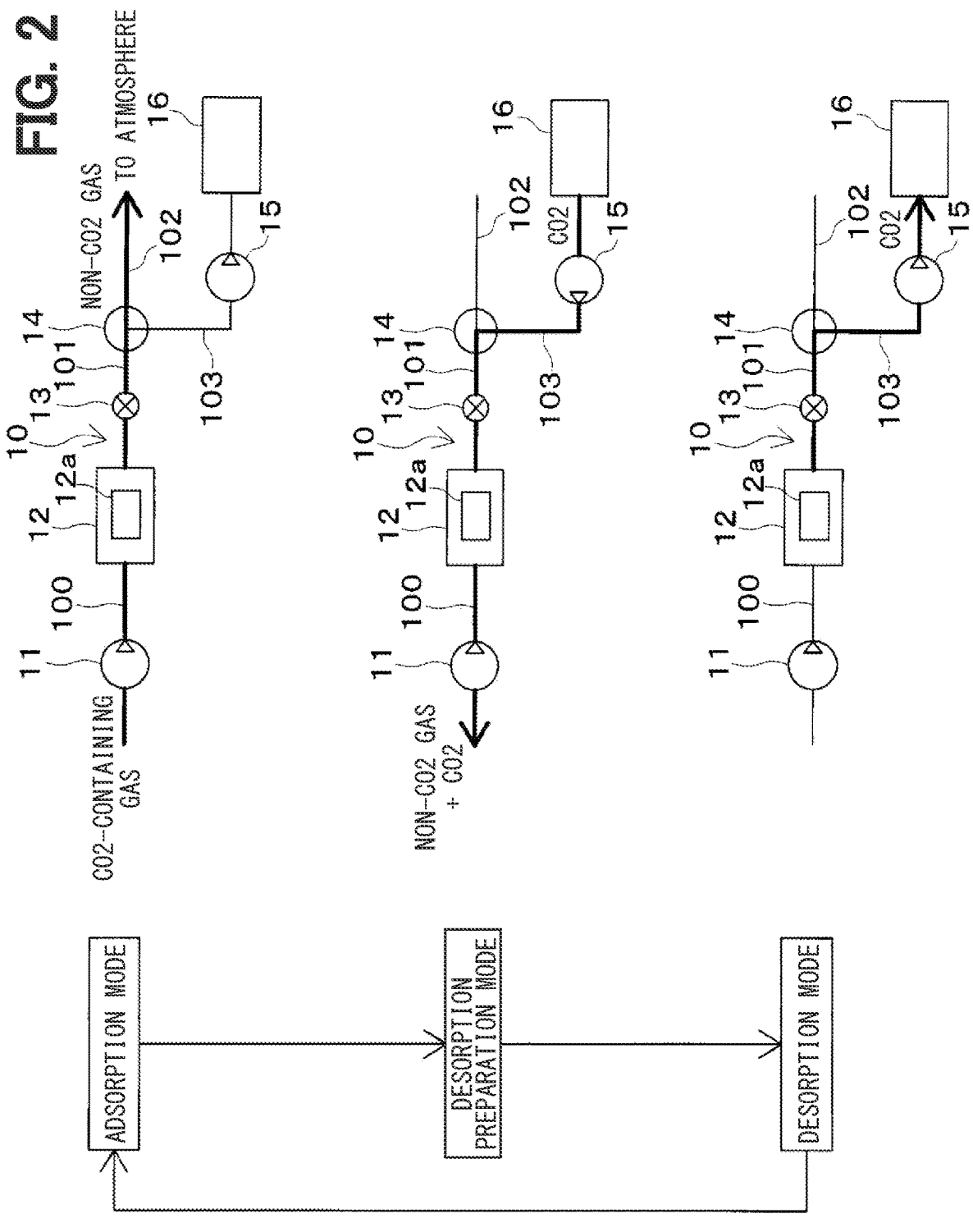
FIG. 2 is a diagram showing gas flows in each of operation modes of the carbon dioxide recovery system of the first embodiment.

As shown in FIG. 2, the multiple operation modes include the adsorption mode, the desorption mode, and the desorption preparation mode. The adsorption mode is an operation mode in which the adsorber 12 adsorbs $CO_2$ contained in the supply gas supplied through the supply channel 100. The desorption mode is an operation mode in which the adsorber 12 desorbs $CO_2$ adsorbed and the storage section 16 stores $CO_2$ desorbed from the adsorber 12. The desorption preparation mode is an operation mode in which the adsorber 12 prepares for desorption of $CO_2$ from an end of the adsorption mode to a start of the desorption mode. These operation modes are repeated in an order of the adsorption mode, the desorption preparation mode, and the desorption mode. In addition, in FIG. 2, the channel through which the gas flows is indicated by a thick solid line.

First, the adsorption mode is described. In the adsorption mode, the first gas supply section 11 is operated to pressurize the supply gas and supply it to the adsorber 12. In the adsorption mode, the valve opening degree of the throttle valve 13 is reduced, the channel switch valve 14 is switched to open the outlet channel 102, and the second gas supply section 15 is stopped. In the adsorption mode, the $CO_2$ partial pressure in the adsorber 12 is set to a predetermined pressure at which $CO_2$ can be adsorbed by the adsorbent 12a.

In the adsorber 12, $CO_2$ contained in the supply gas is adsorbed by the adsorbent 12a, and $CO_2$ is separated from the supply gas. The non-$CO_2$ gas that is contained in the supply gas and has not been adsorbed by the adsorbent 12a is discharged from the adsorber 12 and released to the atmosphere through the outlet channel 102. In the adsorption mode, when the adsorber 12 continues to adsorb $CO_2$, a $CO_2$ adsorption speed of the adsorbent 12a gradually lowers. Therefore, the adsorption mode shifts to the desorption preparation mode at a predetermined adsorption end timing.

In the desorption preparation mode, the second gas supply section 15 is operated so that gas flows in the reverse flow direction. In such mode, the first gas supply section 11 is stopped, the valve opening degree of the throttle valve 13 is increased, and the channel switch valve 14 is switched to open the recovery channel 103 and to close the outlet channel 102. The second gas supply section 15 causes $CO_2$ stored in the storage section 16 to reversely flow through the recovery channel 103 and the discharge channel 101, and supplies $CO_2$ to the adsorber 12. $CO_2$ stored in the storage section 16 is $CO_2$ previously recovered in the previous desorption mode.

Immediately after switching from the adsorption mode to the desorption preparation mode, the non-$CO_2$ gas remains in a portion of the adsorber 12 other than the adsorbent 12a, and in the discharge channel 101. In the desorption preparation mode, the non-$CO_2$ gas remaining in the adsorber 12 is replaced with $CO_2$ by supplying $CO_2$ as a reverse flow gas from the second gas supply section 15. Similarly, the non-$CO_2$ gas remaining in the discharge channel 101 is also replaced with $CO_2$ supplied by the second gas supply section 15.

The non-$CO_2$ gas replaced with $CO_2$ is discharged downstream from the adsorber 12 in the reverse flow direction. That is, in the desorption preparation mode, a discharged gas containing the non-$CO_2$ gas is discharged from the adsorber 12 as $CO_2$ is supplied by the second gas supply section 15.

When the amount of $CO_2$ supplied by the second gas supply section 15 is sufficient to replace the non-$CO_2$ gas, a part of $CO_2$ used for replacing the non-$CO_2$ gas is discharged downstream from the adsorber 12 in the reverse flow direction. That is, in the desorption preparation mode, the discharged gas discharged from the adsorber 12 along with the supply of $CO_2$ by the second gas supply section 15 also contains a part of $CO_2$ used for replacing the non-$CO_2$ gas.

The adsorbent 12a may also adsorb non-$CO_2$ gases other than $CO_2$. By supplying $CO_2$ to the adsorber 12 from the second gas supply section 15, the non-$CO_2$ gas adsorbed by the adsorbent 12a can be desorbed, and $CO_2$ can be adsorbed instead.

In the desorption preparation mode, it is desirable not to desorb from the adsorbent 12a $CO_2$ adsorbed by the adsorbent 12a in the adsorption mode. Therefore, in the desorption preparation mode, it is desirable to make the $CO_2$ partial pressure in the adsorber 12 higher than in the adsorption mode in order to suppress $CO_2$ desorption from the adsorbent 12a.

At a predetermined timing when the replacement of the remaining gas with $CO_2$ in the storage section 16 is complete, the desorption preparation mode shifts to the desorption mode.

In the desorption mode, the second gas supply section 15 is operated to flow gas in the forward flow direction. In the desorption mode, the first gas supply section 11 is stopped, the valve opening degree of the throttle valve 13 is increased, and the channel switch valve 14 is switched to open the recovery channel 103. In the desorption mode, the $CO_2$ partial pressure in the adsorber 12 is made lower than in the adsorption mode.

In the desorption mode, $CO_2$ adsorbed by the adsorbent 12a in the adsorber 12 is desorbed from the adsorbent 12a. $CO_2$ desorbed from the adsorbent 12a is supplied as a desorbed gas to the storage section 16 via the recovery channel 103, and is stored in the storage section 16. Prior to the desorption mode, the insides of the adsorber 12 and the discharge channel 101 are replaced with $CO_2$ in the desorption preparation mode. Therefore, in the desorption mode, $CO_2$ desorbed from the adsorbent 12a and $CO_2$ replacing the non-$CO_2$ gas inside the adsorber 12 and the discharge channel 101 are supplied to the storage section 16, thereby a high concentration $CO_2$ is stored in the storage section 16.

When the desorption mode is continued, the amount of $CO_2$ adsorbed by the adsorber 12 decreases, and the amount of $CO_2$ desorbed from the adsorber 12 gradually decreases. Therefore, the desorption mode is switched to the adsorption mode at a predetermined timing when the amount of $CO_2$ desorbed from the adsorber 12 becomes equal to or less than a predetermined amount.

In the present embodiment described above, the desorption preparation mode is provided for supplying $CO_2$ recovered in advance in the storage section 16, in the reverse flow direction to the adsorber 12 between the adsorption mode in which the adsorber 12 adsorbs $CO_2$ and the desorption mode in which the adsorber 12 desorbs $CO_2$. In the desorption preparation mode, the non-$CO_2$ gas remaining in the adsorber 12 and the discharge channel 101 after the end of the adsorption mode can be replaced with $CO_2$, and a high-concentration $CO_2$ can be recovered in the desorption mode. In such manner, the concentration of $CO_2$ to be recovered can be improved with a simple configuration.

Further, in the present embodiment, it is not necessary to reduce the pressure of the adsorber 12 when removing the non-$CO_2$ gas from the adsorber 12 in the desorption preparation mode. Therefore, it is possible to suppress desorption of $CO_2$ already adsorbed by the adsorbent 12a in the desorption preparation mode, thereby suppressing a decrease in a recovery rate of $CO_2$.

Second Embodiment

The following describes the second embodiment of the present disclosure. Hereinafter, only portions different from the first embodiment are described.

Figure 3:
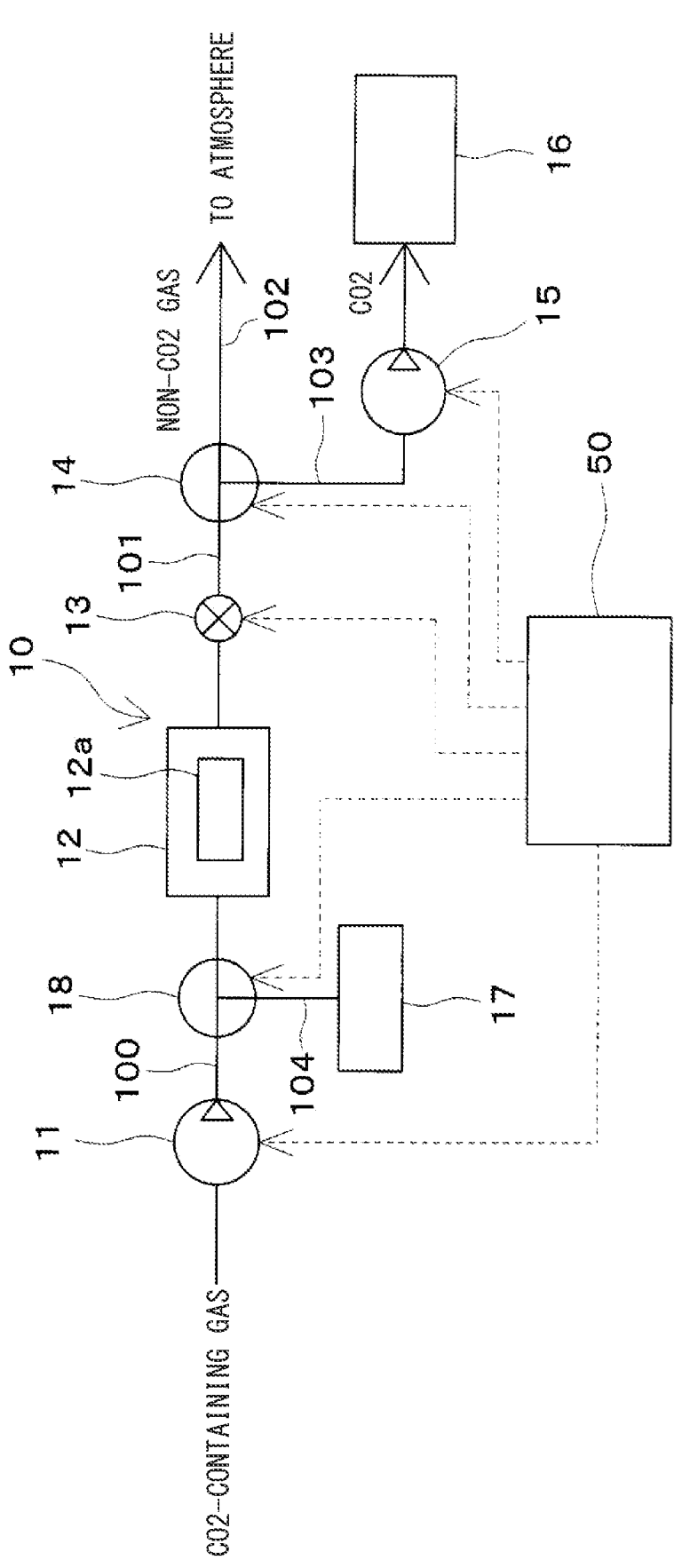
FIG. 3 is a diagram showing a configuration of the carbon dioxide recovery system according to a second embodiment.

As shown in FIG. 3, in a carbon dioxide recovery system 10 of the second embodiment, an auxiliary channel 104 is branched in the supply channel 100, at a position between the first gas supply section 11 and the adsorber 12. An auxiliary storage section 17 is connected to the auxiliary channel 104.

In a desorption preparation mode, the auxiliary storage section 17 temporarily stores the discharged gas discharged from the adsorber 12 along with the supply of $CO_2$ by the second gas supply section 15. The discharged gas contains the non-$CO_2$ gas replaced with $CO_2$ and a portion of $CO_2$ used to replace the non-$CO_2$ gas.

A connection point between a supply channel 100 and the auxiliary channel 104 is provided with an auxiliary channel switch valve 18. The auxiliary channel switch valve 18 switches the communication state of the first gas supply section 11, the adsorber 12, and the auxiliary storage section 17 in the adsorption mode, the desorption preparation mode, or the desorption mode. Channel switching by the auxiliary channel switch valve 18 is performed under the control of the controller 50.

Figure 4:
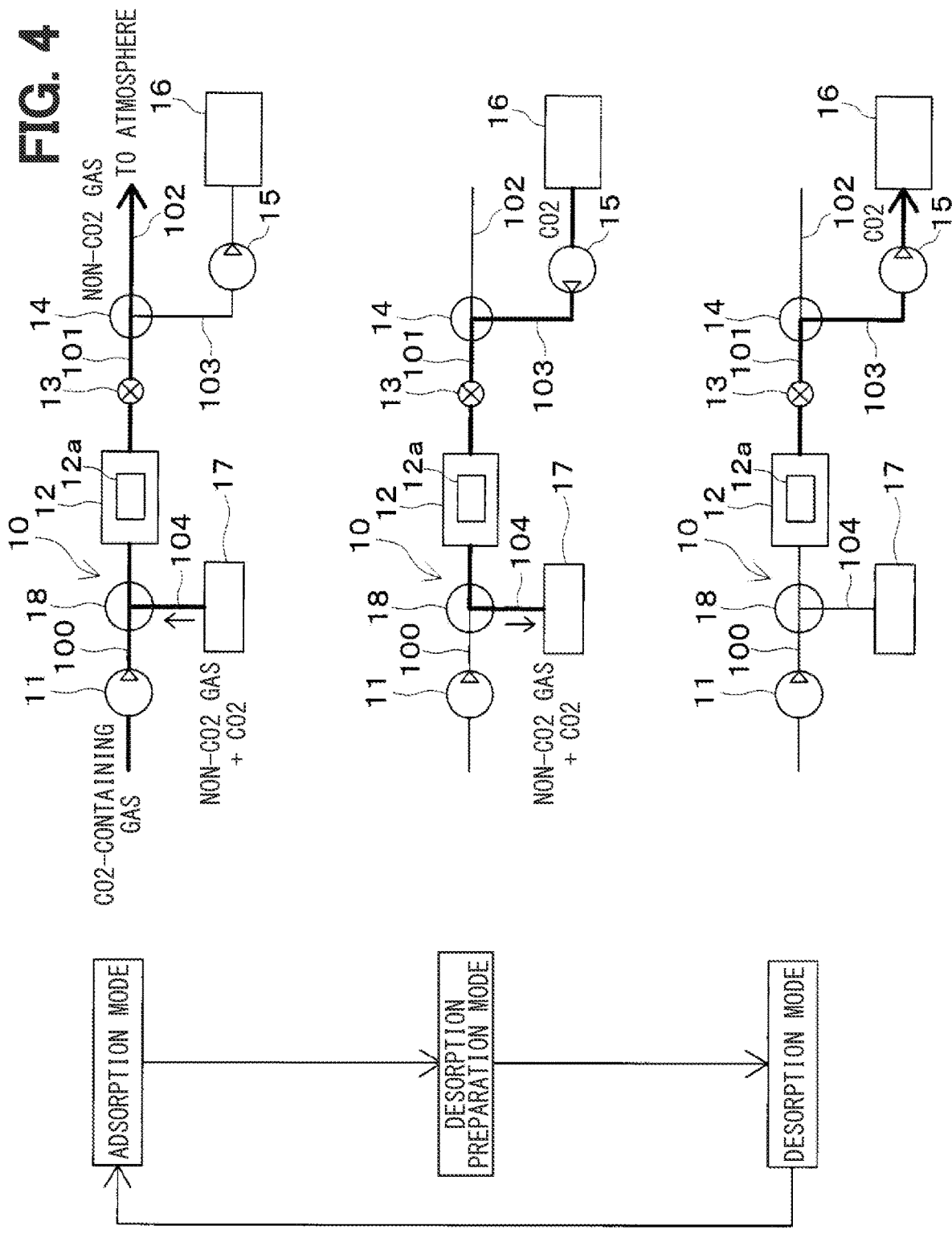
FIG. 4 is a diagram showing gas flows in each of operation modes of the carbon dioxide recovery system of the second embodiment.

Next, the operation of the carbon dioxide recovery system of the second embodiment is described with reference to FIG. 4. In the adsorption mode, the desorption preparation mode, and the desorption mode of the second embodiment, the operations of the first gas supply section 11, the throttle valve 13, the channel switch valve 14, and the second gas supply section 15 are the same as those in the first embodiment.

First, the adsorption mode is described. In the adsorption mode, the auxiliary flow switch valve 18 allows the first gas supply section 11, the adsorber 12 and the auxiliary storage section 17 to communicate with each other.

In the adsorption mode, the supply gas is supplied to the adsorber 12 by the first gas supply section 11. At the start of the adsorption mode, the discharged gas containing the non-$CO_2$ gas and $CO_2$ is stored in the auxiliary storage section 17 in advance in the desorption preparation mode. Therefore, in the adsorption mode, the discharged gas stored in the auxiliary storage section 17 is merged with the supply gas in the supply channel 100 via the auxiliary channel 104, and is supplied to the adsorber 12. In the adsorption mode, in addition to $CO_2$ contained in the supply gas supplied from the first gas supply section 11, $CO_2$ contained in the discharged gas supplied from the auxiliary storage section 17 is also adsorbed by the adsorber 12.

Next, the desorption preparation mode is described. In the desorption preparation mode, the auxiliary channel switch valve 18 allows the adsorber 12 and the auxiliary storage section 17 to communicate with each other. In the desorption preparation mode, the second gas supply section 15 supplies $CO_2$ stored in the storage section 16 in the reverse flow direction. The non-$CO_2$ gas replaced with $CO_2$ and a part of $CO_2$ used for replacement are discharged from the adsorber 12 as the discharged gas. The discharged gas discharged from the adsorber 12 is supplied to the auxiliary storage section 17 through the auxiliary channel 104 and stored in the auxiliary storage section 17.

Since the desorption mode of the second embodiment is the same as that of the first embodiment, the description of such mode is omitted.

In the second embodiment described above, the auxiliary storage section 17 is provided to store therein the discharged gas discharged from the adsorber 12 when $CO_2$ is supplied by the second gas supply section 15 in the desorption preparation mode. In the adsorption mode, the auxiliary storage section 17 is made to supply the stored gas to the adsorber 12. In such manner, a part of $CO_2$ used for replacing the non-$CO_2$ gas in the desorption preparation mode can be adsorbed again by the adsorber 12 in the adsorption mode, thereby improving the $CO_2$ recovery rate.

Third Embodiment

The following describes the third embodiment of the present disclosure. Hereinafter, only portions different from the above-described embodiments are described. In the third embodiment, the adsorber 12, the throttle valve 13, and the channel switch valve 14 of the first and second embodiments are designated as a first adsorber 12, a first throttle valve 13, and a first channel switch valve 14, respectively.

Figure 5:
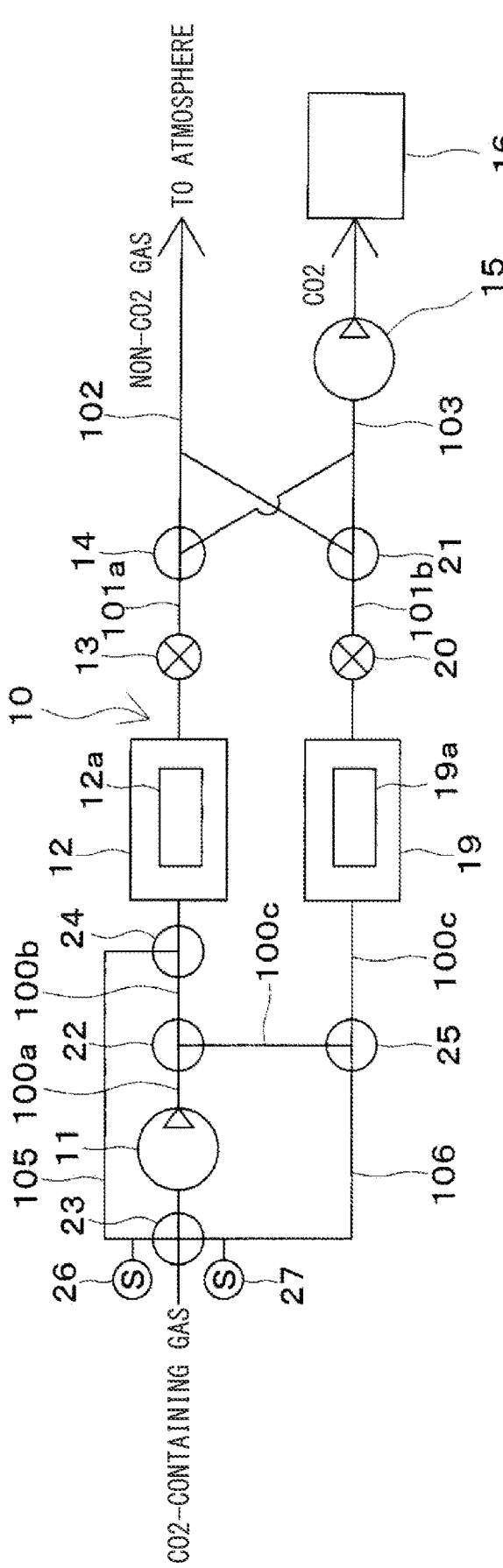
FIG. 5 is a diagram showing a configuration of the carbon dioxide recovery system according to a third embodiment.

As shown in FIG. 5, a supply channel 100 of the third embodiment includes a first supply channel 100*a*, a second supply channel 100*b* and a third supply channel 100*c*. The first supply channel 100*a* is branched at a downstream side into the second supply channel 100*b* and the third supply channel 100*c*. The second supply channel 100*b* and the third supply channel 100*c* are provided in parallel. The first supply channel 100*a* communicates with either the second supply channel 100*b* or the third supply channel 100*c*.

The first gas supply section 11 is provided in the first supply channel 100*a*. In the third embodiment, a plurality of adsorbers 12 and 19 are provided. The first adsorber 12 is provided in the second supply channel 100*b*, and the second adsorber 19 is provided in the third supply channel 100*c*. These adsorbers 12 and 19 have the same configuration, and are provided with adsorbents 12*a* and 19*a*, respectively.

The first adsorber 12 and the second adsorber 19 are arranged in parallel. When the first adsorber 12 operates in the adsorption mode, the second adsorber 19 operates in the desorption preparation mode or the desorption mode. When the second adsorber 19 operates in the adsorption mode, the first adsorber 12 operates in the desorption preparation mode or the desorption mode.

A discharge channel 101 of the third embodiment includes a first discharge channel 101*a* and a second discharge channel 101*b*. The first discharge channel 101*a* is connected to the first adsorber 12, and the second discharge channel 101*b* is connected to the second adsorber 19.

The first throttle valve 13 is provided in the first discharge channel 101*a*. A second throttle valve 20 is provided in the second discharge channel 101*b*. These throttle valves 13 and 20 have the same configuration, and each has a variable throttle mechanism capable of adjusting the opening degree of the valve, so that the gas pressure inside the adsorbers 12, 19 can be changed. The first and second throttle valves 13 and 20 are used as a part of a pressure adjustment section that adjusts the $CO_2$ partial pressure inside the adsorbers 12 and 19.

The downstream sides of the first discharge channel 101*a* and the second discharge channel 101*b* are connected to the outlet channel 102 and the recovery channel 103, respectively. The first discharge channel 101*a* and the second discharge channel 101*b* communicate with either the outlet channel 102 or the recovery channel 103, respectively. When the first discharge channel 101*a* communicates with the outlet channel 102, the second discharge channel 101*b* communicates with the recovery channel 103, and, when the first discharge channel 101*a* communicates with the recovery channel 103, the second discharge channel 101*b* communicates with the outlet channel 102.

A connection point of the first discharge channel 101*a*, the outlet channel 102 and the recovery channel 103 is provided with a first channel switch valve 14. The first channel switch valve 14 switches between (i) a state in which the first discharge channel 101*a* and the outlet channel 102 communicate with each other and (ii) a state in which the first discharge channel 101*a* and the recovery channel 103 communicate with each other.

A second channel switch valve 21 is provided at a connection point of the second discharge channel 101*b*, the outlet channel 102 and the recovery channel 103. The second channel switch valve 21 switches between (i) a state in which the second discharge channel 101*b* and the outlet channel 102 communicate with each other and (ii) a state in which the second discharge channel 101*b* and the recovery channel 103 communicate with each other.

A third channel switch valve 22 is provided at a connection point of the first supply channel 100*a*, the second supply channel 100*b* and the third supply channel 100*c*. The third channel switch valve 22 switches between (i) a state in which the first supply channel 100*a* and the second supply channel 100*b* communicate with each other and (ii) a state in which the first supply channel 100*a* and the third supply channel 100*c* communicate with each other.

A first bypass channel 105 that bypasses the first gas supply section 11 is provided in the first supply channel 100*a* and the second supply channel 100*b*. The first bypass channel 105 connects an upstream portion of the first gas supply section 11 in the first supply channel 100*a*, and the second supply channel 100*b*.

A second bypass channel 106 that bypasses the first gas supply section 11 is provided in the first supply channel 100*a* and the third supply channel 100*c*. The second bypass channel 106 connects an upstream portion of the first gas supply section 11 in the first supply channel 100*a*, and the third supply channel 100*c*.

A fourth channel switch valve 23 is provided at a connection point between the first supply channel 100*a*, the first bypass channel 105 and the second bypass channel 106. The fourth channel switch valve 23 switches between (i) a connection state in which the first supply channel 100*a* and the first bypass channel 105 are connected to each other, and (ii) a connection state in which the first supply channel 100*a* and the second bypass channel 106 are connected to each other.

A connection point between the second supply channel 100*b* and the first bypass channel 105 is provided with a fifth channel switch valve 24. The fifth channel switch valve 24 switches (i) a state in which an upstream portion and a downstream portion of the fifth channel switch valve 24 in the second supply channel 100*b* communicate with each other, and (ii) a state in which a downstream portion of the fifth channel switch valve 24 in the second supply channel 100*b* and the first bypass channel 105 communicate with each other.

A sixth channel switch valve 25 is provided at a connection point between the third supply channel 100*c* and the second bypass channel 106. The sixth channel switch valve 25 switches (i) a state in which an upstream portion and a downstream portion of the sixth channel switch valve 25 in the third supply channel 100*c* communicate, and (ii) a state in which a downstream portion of the sixth channel switch valve 25 in the third supply channel 100*c* and the second bypass channel 106 communicate with each other.

When the first adsorber 12 is operating in the desorption preparation mode, the discharged gas discharged from the first adsorber 12 flows into the first bypass channel 105. When the second adsorber 19 is operating in the desorption preparation mode, the discharged gas discharged from the second adsorber 19 flows into the second bypass channel 106.

A first gas concentration sensor 26 that detects the $CO_2$ concentration of the discharged gas discharged from the first adsorber 12 is provided in the first bypass channel 105. A second gas concentration sensor 27 that detects the $CO_2$ concentration of the discharged gas discharged from the second adsorber 19 is provided in the second bypass channel 106.

Figure 6:
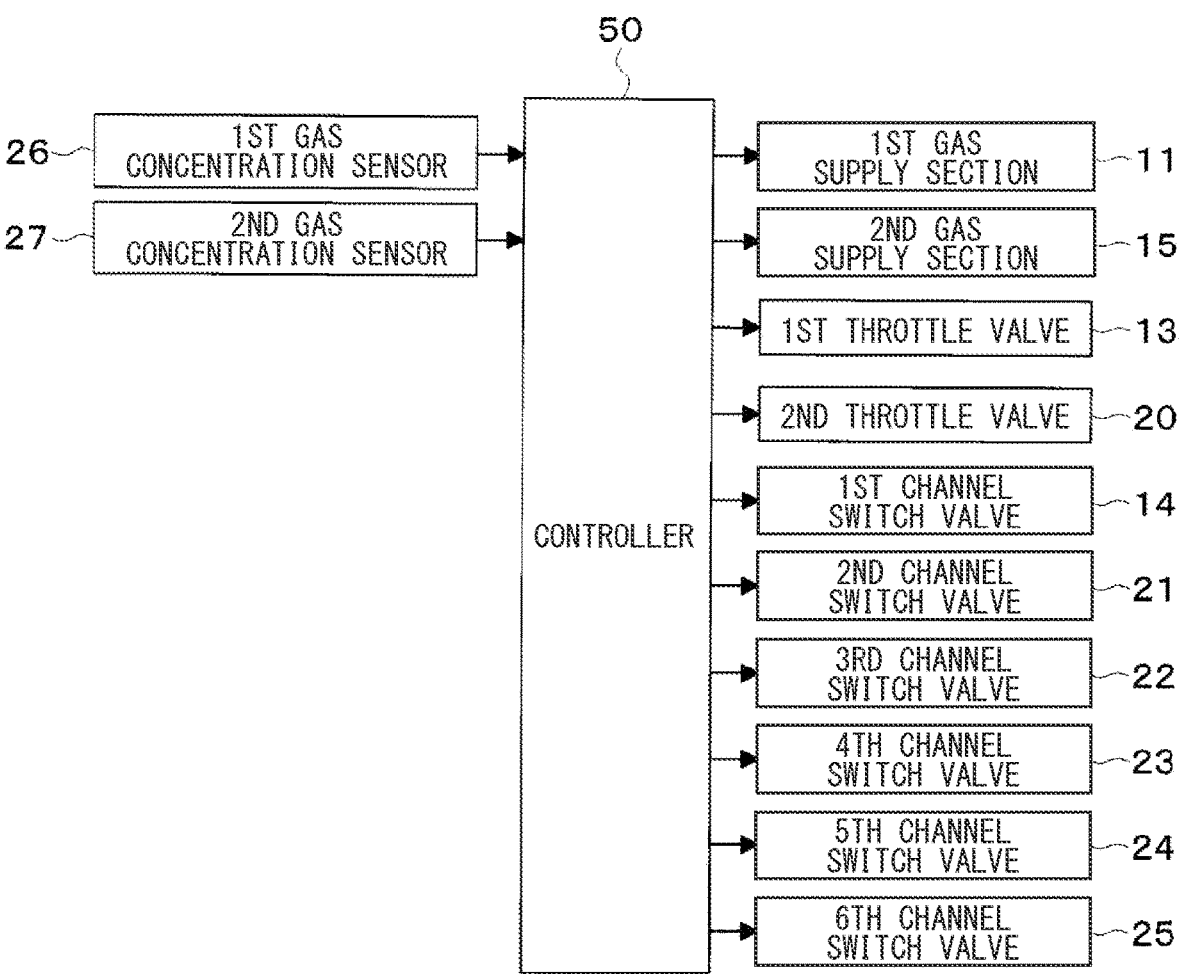
FIG. 6 is a block diagram showing an electric control section of the carbon dioxide recovery system according to the third embodiment.

As shown in FIG. 6, the controller 50 of the third embodiment receives sensor signals from the gas concentration sensors 26 and 27. Further, the controller 50 of the third embodiment outputs control signals to the gas supply sections 11 and 15, the throttle valves 13 and 20, and the channel switch valves 14, 21, 22, 23, 24, and 25. Based on sensor values of the gas concentration sensors 26 and 27, the controller 50 performs a switch operation from the desorption preparation mode to the desorption mode.

Next, the operation of the carbon dioxide recovery system 10 of the third embodiment is described. The operation of the carbon dioxide recovery system 10 is performed under the control of the controller 50.

First, a case where the first adsorber 12 operates in the adsorption mode and the second adsorber 19 operates in the desorption preparation mode and the desorption mode is described with reference to FIGS. 7 and 8.

Figure 7:
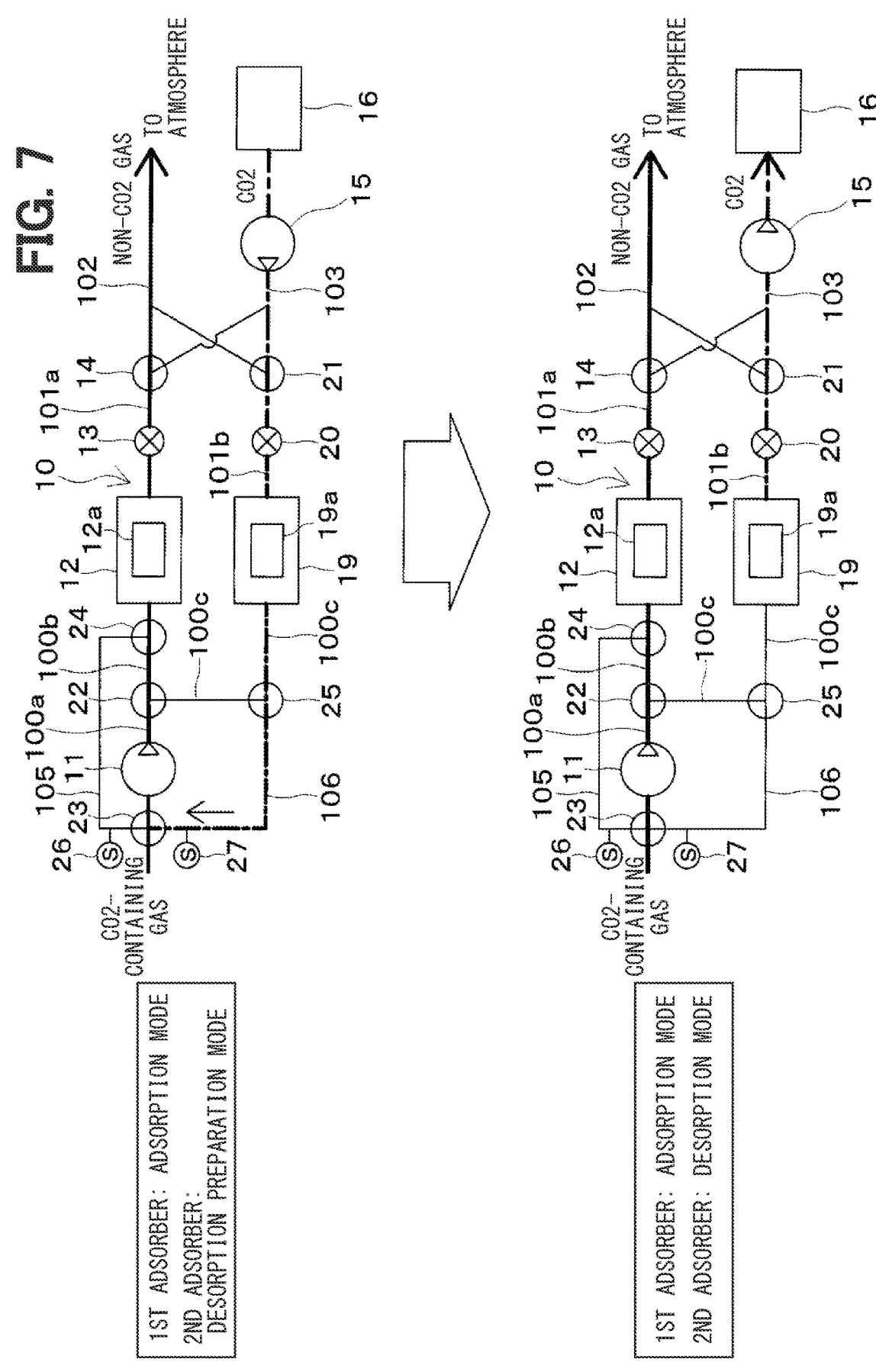
FIG. 7 is a diagram showing gas flows when a second adsorber of the third embodiment switches from a desorption preparation mode to a desorption mode.

In FIG. 7, the gas flow passing through the first adsorber 12 is indicated by a thick solid line, and the gas flow passing through the second adsorber 19 is indicated by a thick dashed-dotted line. An upper part of FIG. 7 shows a case where the first adsorber 12 is in the adsorption mode and the second adsorber 19 is in the desorption preparation mode. A lower part of FIG. 7 shows a case where the first adsorber 12 is in the adsorption mode and the second adsorber 19 is in the desorption mode.

Figure 8:
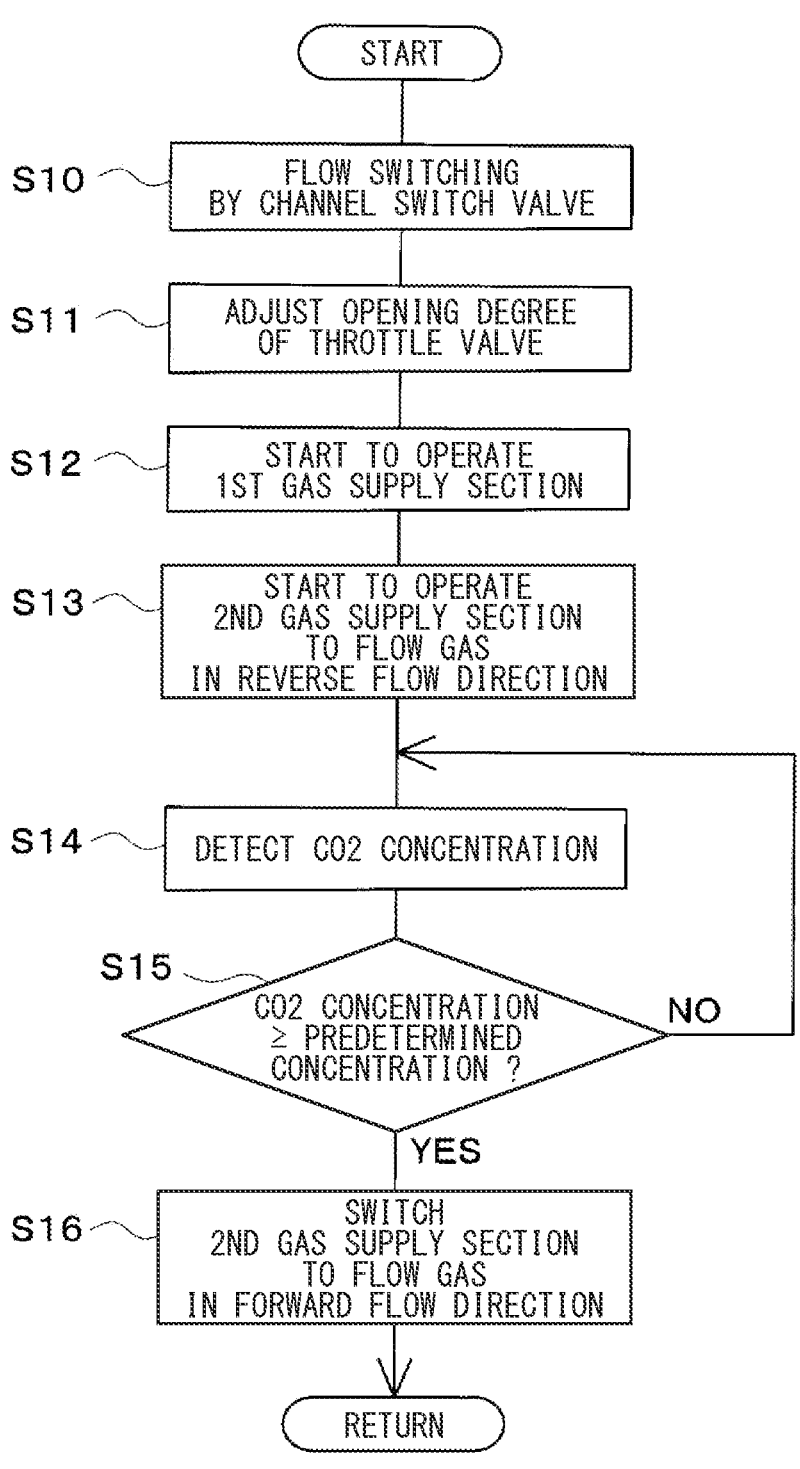
FIG. 8 is a flowchart showing control processing when an adsorber of the third embodiment switches from the desorption preparation mode to the desorption mode.

As shown in the flowchart of FIG. 8, first, in the processing of S10, channel switching is performed by the channel switch valves 14, 21, 22, 23, 24, and 25. The first channel switch valve 14 allows the first discharge channel 101a and the outlet channel 102 to communicate with each other. The second channel switch valve 21 allows the second discharge channel 101b and the recovery channel 103 to communicate with each other. The third channel switch valve 22 allows communication between the first supply channel 100a and the second supply channel 100b. The fourth channel switch valve 23 allows communication between the second bypass channel 106 and the first supply channel 100a. The fifth channel switch valve 24 allows communication between the upstream portion and the downstream portion of the fifth channel switch valve 24 in the second supply channel 100b. The sixth channel switch valve 25 allows communication between the downstream portion of the sixth channel switch valve 25 in the third supply channel 100c and the second bypass channel 106.

The opening degrees of the throttle valves 13 and 20 are adjusted in the processing of S11. The valve opening degree of the first throttle valve 13 is decreased and the valve opening degree of the second throttle valve 20 is increased.

Next, the first gas supply section 11 is started to operate in the processing of S12, and the second gas supply section 15 is started to operate and to flow gas, in the reverse flow direction in the processing of S13.

By operating the first gas supply section 11, the supply gas is supplied to the first adsorber 12 via the first supply channel 100a and the second supply channel 100b. The first adsorber 12 adsorbs $CO_2$ contained in the supply gas, and the non-$CO_2$ gas that is not adsorbed by the first adsorber 12 in the supply gas is discharged through the first discharge channel 101a and the outlet channel 102, and is released into the atmosphere.

By operating the second gas supply section 15 to flow the gas in the reverse flow direction, $CO_2$ stored in the storage section 16 is supplied to the second adsorber 19 via the recovery channel 103 and the second discharge channel 101b. The non-$CO_2$ gas existing in the second adsorber 19 and the second discharge channel 101b is replaced with $CO_2$. From the second adsorber 19, the discharged gas containing (i) the non-$CO_2$ gas replaced with $CO_2$ and (ii) a part of $CO_2$ used for replacement of the non-$CO_2$ gas is discharged.

The discharged gas discharged from the second adsorber 19 flows into the first supply channel 100a via the second bypass channel 106, and merges with the supply gas. The discharged gas is supplied to the first adsorber 12 together with the supply gas, and $CO_2$ contained in the discharged gas is adsorbed by the first adsorber 12.

Next, in the processing of S14, the second gas concentration sensor 27 detects the $CO_2$ concentration of the discharged gas discharged from the second adsorber 19, and, in the processing of S15, it is determined whether or not the $CO_2$ concentration has reached or exceeded a predetermined concentration.

Immediately after the desorption preparation mode is started in the second adsorber 19, the non-$CO_2$ gas concentration of the discharged gas discharged from the second adsorber 19 is high. When the desorption preparation mode is continued for a time, the replacement of the non-$CO_2$ gas with $CO_2$ progresses, thereby the $CO_2$ gas concentration of the discharged gas discharged from the second adsorber 19 gradually increases. In the third embodiment, when the $CO_2$ concentration detected by the second gas concentration sensor 27 exceeds a predetermined concentration, it is determined that (i) the non-$CO_2$ gas in the second adsorber 19 is sufficiently replaced with $CO_2$, and (ii) a timing for switching from the desorption preparation mode to the remote mode has arrived.

When it is determined in the processing of S15 that the $CO_2$ concentration has not exceeded the predetermined concentration, the processing returns to S14. On the other hand, when it is determined in the processing of S15 that the $CO_2$ concentration has reached or exceeded the predetermined concentration, the second gas supply section 15 is operated so that gas flows in the forward flow direction in the processing of S16. In such manner, the second adsorber 19 shifts from the desorption preparation mode to the desorption mode, and the carbon dioxide recovery system 10 shifts from the state shown in the upper part of FIG. 7 to the state shown in the lower part of FIG. 7.

The second adsorber 19 desorbs the adsorbed $CO_2$ by shifting to the desorption mode. The $CO_2$ desorbed from the second adsorber 19 is supplied to the storage section 16 as a desorbed gas via the recovery channel 103 and stored in the storage section 16.

Figure 9:
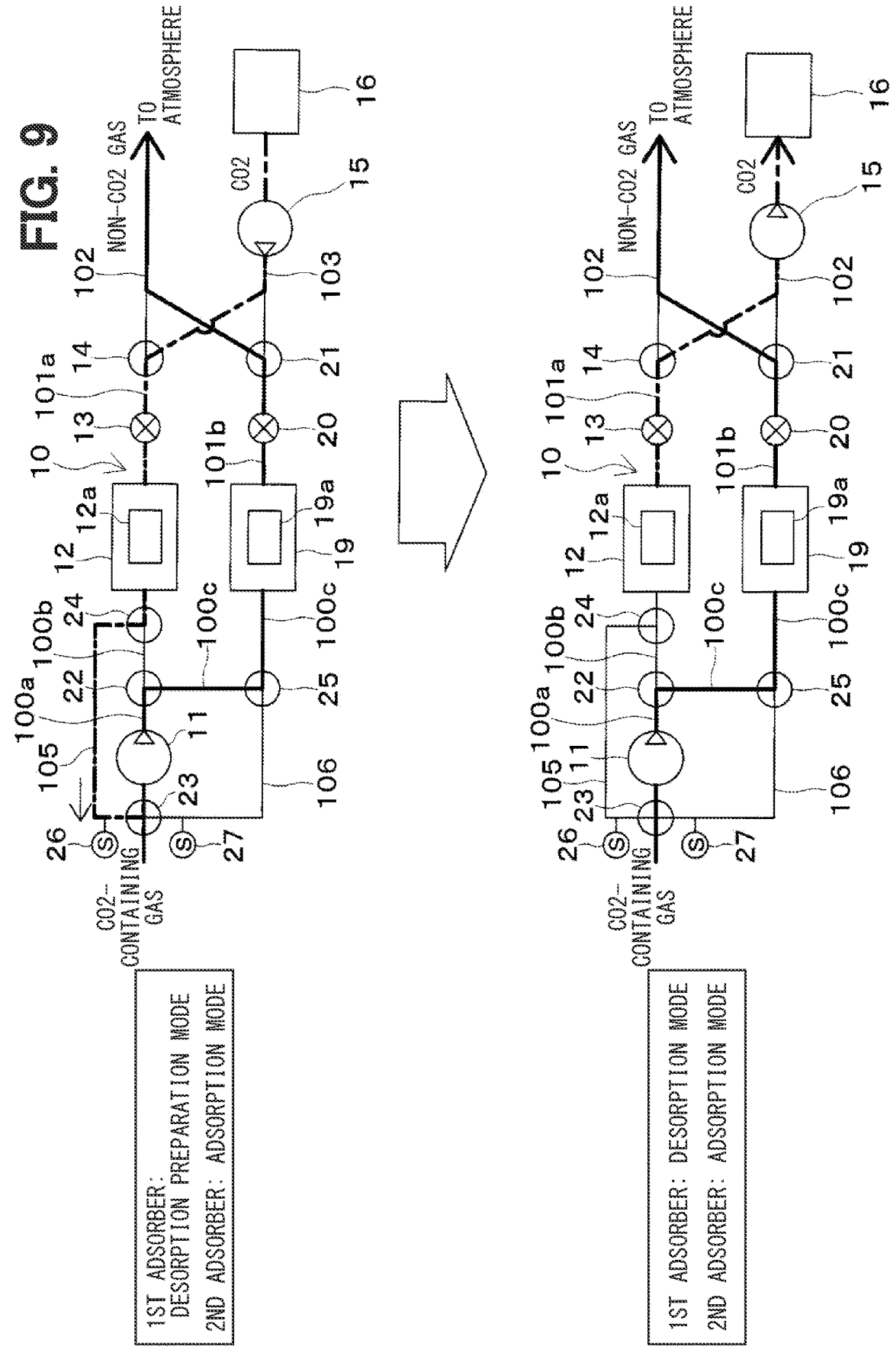
FIG. 9 is a diagram showing gas flows when a first adsorber of the third embodiment switches from the desorption preparation mode to the desorption mode.

Next, a case, where the first adsorber 12 operates in the desorption preparation mode and the desorption mode and the second adsorber 19 operates in the adsorption mode, is described with reference to FIG. 9. In FIG. 9, the gas flow passing through the first adsorber 12 is indicated by a thick dashed-dotted line, and the gas flow passing through the second adsorber 19 is indicated by a thick solid line. The upper part of FIG. 9 shows a case where the first adsorber 12 is in the desorption preparation mode and the second adsorber 19 is in the adsorption mode. The lower part of FIG. 9 shows a case where the first adsorber 12 is in the desorption mode and the second adsorber 19 is in the adsorption mode. When the first adsorber 12 operates in the desorption preparation mode and the desorption mode, and the second adsorber 19 operates in the adsorption mode, the control process is also performed according to the flowchart of FIG. 8.

First, the flow channels are switched by the channel switch valves 14, 21, 22, 23, 24, and 25 in the processing of S10. The first channel switch valve 14 allows the first discharge channel 101*a* and the recovery channel 103 to communicate with each other. The second channel switch valve 21 allows the second discharge channel 101*b* and the outlet channel 102 to communicate with each other. The third channel switch valve 22 allows communication between the first supply channel 100*a* and the third supply channel 100*c*. The fourth channel switch valve 23 allows the first bypass channel 105 and the first supply channel 100*a* to communicate with each other. The fifth channel switch valve 24 allows communication between a downstream portion of the fifth channel switch valve 24 in the second supply channel 100*b* and the first bypass channel 105. The sixth channel switch valve 25 allows communication between an upstream portion and a downstream portion of the sixth channel switch valve 25 in the third supply channel 100*c*.

Next, the opening degrees of the throttle valves 13 and 20 are adjusted in the processing of S11. The valve opening degree of the first throttle valve 13 is increased and the valve opening degree of the second throttle valve 20 is decreased.

Next, the first gas supply section 11 is started to operate in the processing of S12, and the second gas supply section 15 is started so that gas flows in the reverse flow direction in the processing of S13.

By operating the first gas supply section 11, the supply gas is pressurized and supplied to the second adsorber 19 via the first supply channel 100*a* and the third supply channel 100*c*. The second adsorber 19 adsorbs $CO_2$ contained in the supply gas, and the non-$CO_2$ gas of the supply gas, which is not adsorbed by the second adsorber 19, is discharged through the second discharge channel 101*b* and the outlet channel 102, and is released into the atmosphere.

By operating the second gas supply section 15 to flow the gas in the reverse flow direction, $CO_2$ stored in the storage section 16 is supplied to the first adsorber 12 as a reverse flow gas through the recovery channel 103 and the first discharge channel 101*a*. The non-$CO_2$ gas existing in the first adsorber 12 and the first discharge channel 101*a* is replaced with $CO_2$. The discharged gas containing (i) the non-$CO_2$ gas replaced with $CO_2$ and (ii) a part of $CO_2$ used for replacing the non-$CO_2$ gas is discharged from the first adsorber 12.

The discharged gas discharged from the first adsorber 12 flows into the first supply channel 100*a* via the first bypass channel 105 and merges with the supply gas. The discharged gas is supplied to the second adsorber 19 together with the supply gas, and $CO_2$ contained in the discharged gas is adsorbed by the second adsorber 19.

Next, in the processing of S14, the first gas concentration sensor 26 detects the $CO_2$ concentration of the discharged gas discharged from the first adsorber 12, and, in the processing of S15, it is determined whether or not the $CO_2$ concentration has reached or exceeded a predetermined concentration.

When it is determined in the determination processing of S15 that the $CO_2$ concentration has reached or exceeded the predetermined concentration, the second gas supply section 15 is operated so that the gas flows in the forward flow direction in the processing of S16. In such manner, the first adsorber 12 shifts from the desorption preparation mode to the desorption mode, and the carbon dioxide recovery system 10 shifts from the state shown in the upper part of FIG. 9 to the state shown in the lower part of FIG. 9. The first adsorber 12 desorbs the adsorbed $CO_2$ by shifting to the desorption mode. $CO_2$ desorbed from the first adsorber 12 is supplied to the storage section 16 as a desorbed gas through the first discharge channel 101*a* and the recovery channel 103, and is stored in the storage section 16.

Figure 10:
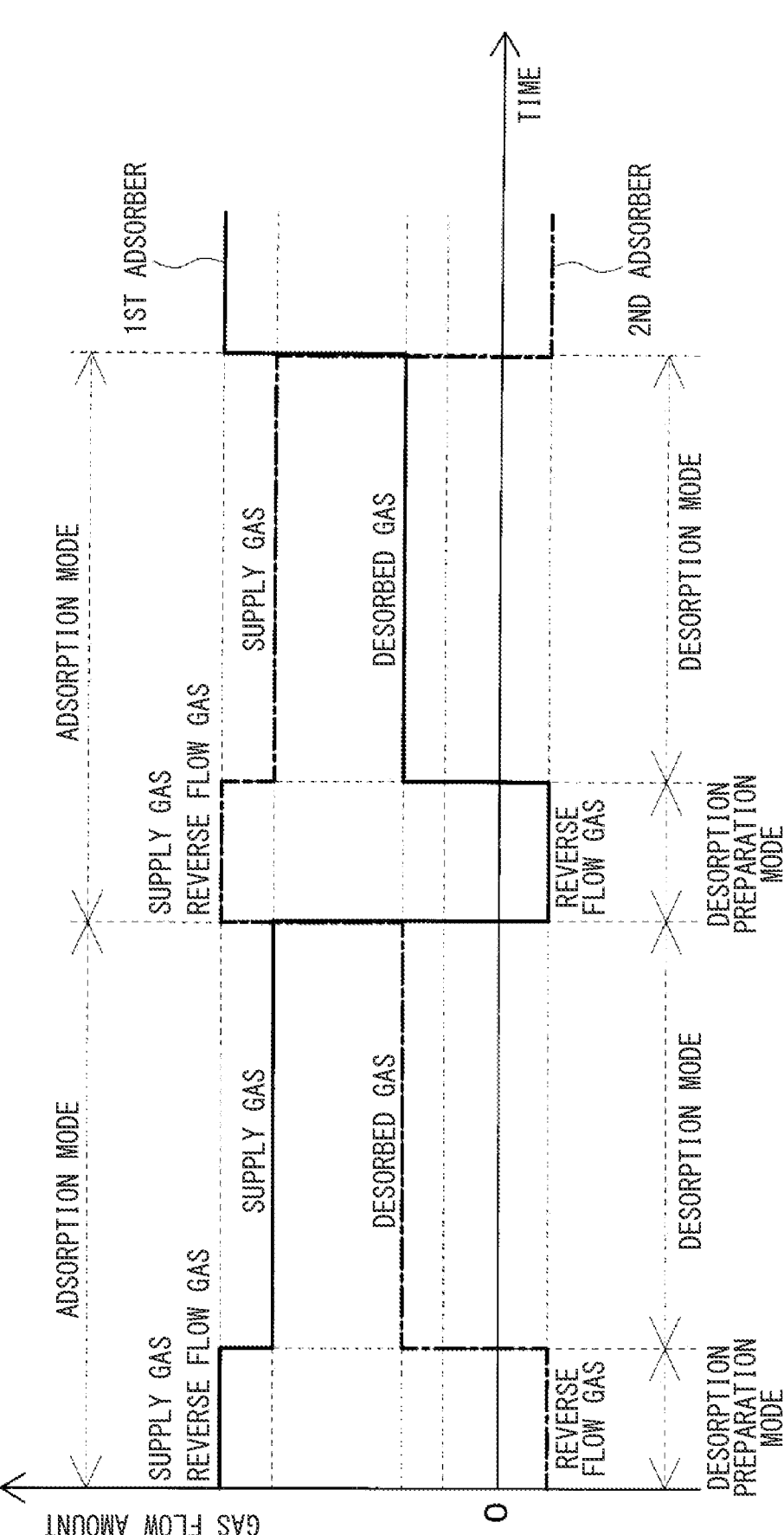
FIG. 10 is a graph showing time changes of gas flow rates in the first adsorber and the second adsorber according to the third embodiment.

Here, chronological changes of gas flow rates in the first adsorber 12 and the second adsorber 19 are described with reference to FIG. 10. In FIG. 10, the solid line indicates the gas flow rate of the first adsorber 12, and the one-dot chain line indicates the gas flow rate of the second adsorber 19. In FIG. 10, the gas flow in the forward flow direction has a positive gas flow rate, and the gas flow in the reverse flow direction has a negative gas flow rate.

First, in a state where the first adsorber 12 operates in the adsorption mode and the second adsorber 19 operates in the desorption preparation mode, the reverse flow gas flows in the second adsorber 19, and the supply gas and the reverse flow gas supplied from the second adsorber 19 flow in the first adsorber 12.

When the second adsorber 19 shifts from the desorption preparation mode to the desorption mode, only the supply gas flows in the first gas supply section 11 and the desorbed gas flows in the forward flow direction through the second adsorber 19.

Next, in a state where the first adsorber 12 operates in the desorption preparation mode and the second adsorber 19 operates in the adsorption mode, the reverse flow gas flows in the first adsorber 12, and the supply gas and the reverse flow gas supplied from the first adsorber 12 flow in the second adsorber 19.

When the first adsorber 12 shifts from the desorption preparation mode to the desorption mode, only the supply gas flows in the second adsorber 19, and the desorbed gas flows in the forward flow direction through the first adsorber 12.

As shown in FIG. 10, in the first adsorber 12 and the second adsorber 19, an execution time of the desorption mode is longer than an execution time of the desorption preparation mode. Therefore, it is possible to secure sufficient time for $CO_2$ to be desorbed from the first adsorber 12 and the second adsorber 19, respectively.

In the third embodiment described above, a plurality of adsorbers 12 and 19 are provided, and, when a specific one of adsorbers 12 and 19 operates in the adsorption mode, the other one of adsorbers 12 and 19 operates in the desorption preparation mode or the desorption mode. In such manner, the adsorption of $CO_2$ and the desorption of $CO_2$ can be alternately performed by the plurality of adsorbers 12 and 19, and the adsorption of $CO_2$ and the desorption of $CO_2$ can be continuously performed by the system as a whole. In such manner, the carbon dioxide recovery system of the third embodiment can continuously recover $CO_2$.

Further, in the third embodiment, the discharged gas discharged from the adsorbers 12 and 19 in the desorption preparation mode along with the supply of $CO_2$ by the second gas supply section 15 are supplied to the adsorbers 12 and 19 in the adsorption mode. In such manner, $CO_2$ contained in the discharged gas discharged from the adsorbers 12 and 19 operating in the desorption preparation mode can be adsorbed by the adsorbers 12 and 19 operating in the adsorption mode. In such manner, $CO_2$ used to replace the non-$CO_2$ gas can be effectively used, and the recovery rate of $CO_2$ can be improved.

Further, in the third embodiment, when the $CO_2$ concentration of the discharged gas discharged from the adsorber 12, 19 operating in the desorption preparation mode reaches or exceeds a predetermined concentration, the desorption preparation mode shifts to the desorption mode. In such manner, it is possible to avoid $CO_2$ with a predetermined concentration or less from being recovered, thereby increasing the concentration of $CO_2$ to be recovered.

Further, in the adsorbers 12 and 19 of the third embodiment, the execution time of the desorption mode is longer than the execution time of the desorption preparation mode. In such manner, sufficient time can be secured for $CO_2$ to be desorbed from the adsorbers 12 and 19.

Fourth Embodiment

Next, the fourth embodiment of the present disclosure is described. Hereinafter, only portions different from the above-described embodiments are described.

In the fourth embodiment, gas concentration sensors 26 and 27 shown in FIG. 5 are configured to detect the non-$CO_2$ gas concentration of the discharged gas discharged from adsorbers 12,19 in a desorption preparation mode, which is different from the above-described third embodiment.

In a carbon dioxide recovery system 10 of the fourth embodiment, a situation is described with reference to the flowchart in FIG. 11, in which the first adsorber 12 operates in the adsorption mode, and the second adsorber 19 operates in the desorption preparation mode or the desorption mode. In the control process shown in FIG. 11, the processing of S20 to S23 and S26 are respectively the same as the processing of S10 to S13 and S16 of the above-described third embodiment, thereby description thereof is omitted.

Figure 11:
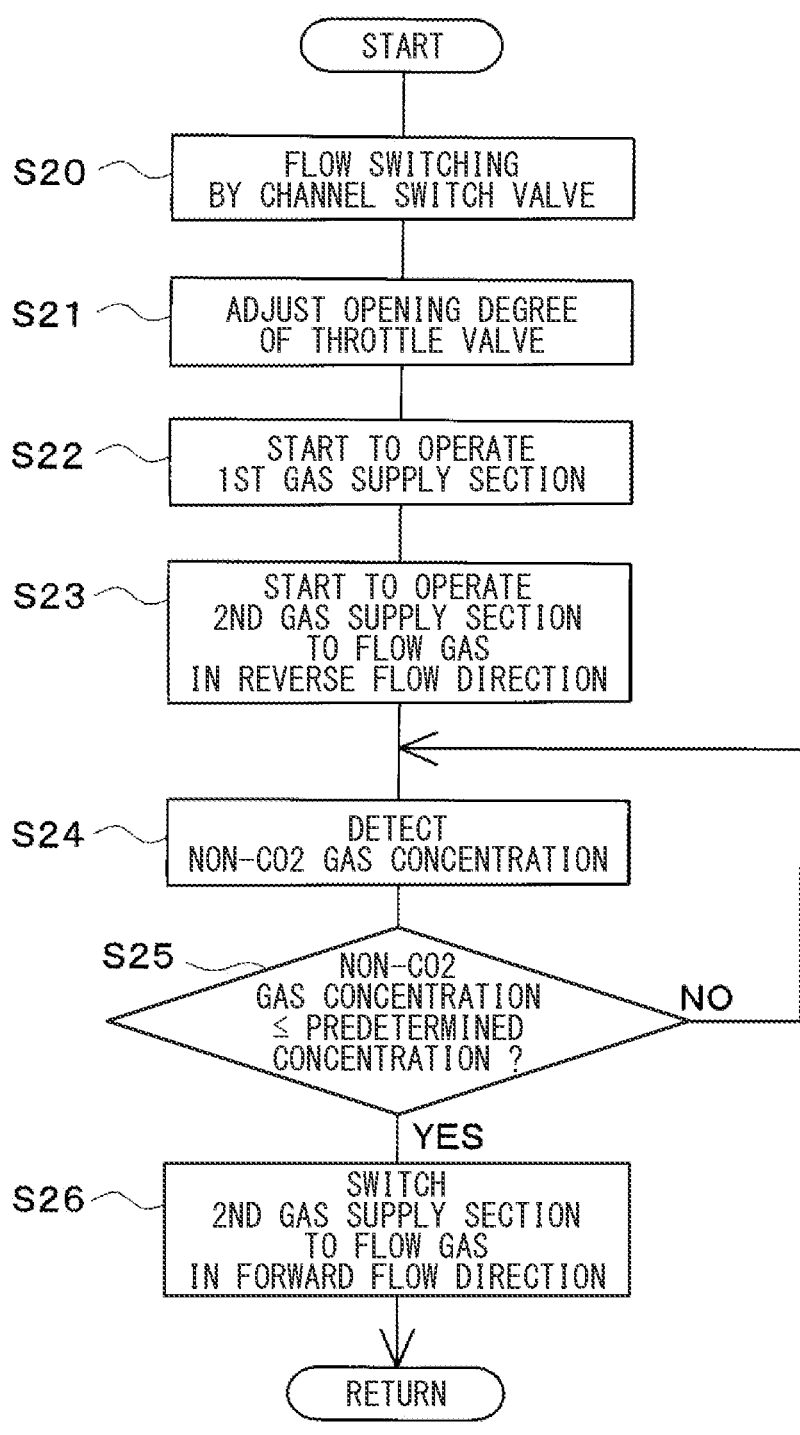
FIG. 11 is a flowchart showing control processing when an adsorber according to a fourth embodiment switches from a desorption preparation mode to a desorption mode.

As shown in FIG. 11, in the fourth embodiment, after the operation of the second gas supply section 15 is started to flow the gas in the reverse flow direction, the gas discharged from the first adsorber 12 is detected by the first gas concentration sensor 26 in the processing of S24 for detecting the non-$CO_2$ gas concentration of such discharged gas. Then, in the processing of S25, it is determined whether or not the non-$CO_2$ gas concentration has become equal to or less than a predetermined concentration.

When it is determined in the determination processing of S25 that the non-$CO_2$ gas concentration has become equal to or less than the predetermined concentration, the second gas supply section 15 is operated so that the gas flows in the forward flow direction in the processing of S26. In such manner, the first adsorber 12 shifts from the desorption preparation mode to the desorption mode. The first adsorber 12 desorbs the adsorbed $CO_2$ by shifting to the desorption mode. $CO_2$ desorbed from the first adsorber 12 is supplied to the storage section 16 as a desorbed gas through the first discharge channel 101$a$ and the recovery channel 103, and is stored in the storage section 16.

According to the fourth embodiment described above, when the non-$CO_2$ gas concentration of the discharged gas discharged from the adsorbers 12, 19 operating in the desorption preparation mode reaches or exceeds the predetermined concentration, the desorption preparation mode shifts to the desorption mode. In such manner, it is possible to avoid recovering of $CO_2$ with a predetermined concentration or less, thereby increasing the concentration of $CO_2$ to be recovered.

Fifth Embodiment

Next, the fifth embodiment of the present disclosure is described. Hereinafter, only portions different from the above-described embodiments are described.

A carbon dioxide recovery system of the fifth embodiment differs from the third embodiment in that the gas concentration sensors 26 and 27 shown in FIG. 5 are not provided.

In the carbon dioxide recovery system 10 of the fifth embodiment, a situation is described with reference to the flowchart of FIG. 12, in which the first adsorber 12 operates in the adsorption mode, and the second adsorber 19 operates in the desorption preparation mode or the desorption mode. In the control process shown in FIG. 12, the processing of S30 to S33 and S36 are respectively the same as the processing of S10 to S13 and S16 of the above-described third embodiment, thereby description thereof is omitted.

Figure 12:
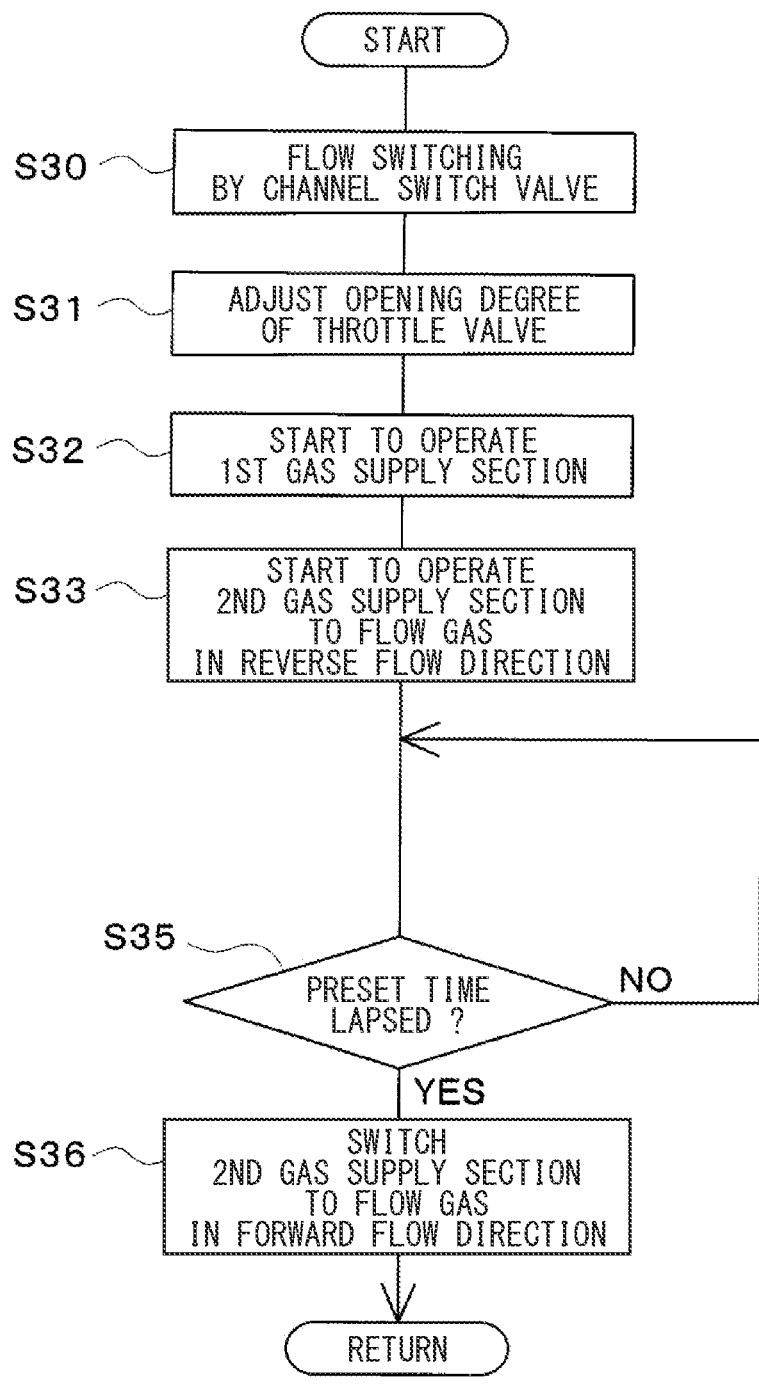
FIG. 12 is a flowchart showing control processing when an adsorber according to a fifth embodiment switches from a desorption preparation mode to a desorption mode.

As shown in FIG. 12, in the fifth embodiment, after the operation of the second gas supply section 15 is started to flow the gas in the reverse flow direction, it is determined whether a lapse time from the start of the desorption preparation mode in the processing of S35 has reached a predetermined time. The "predetermined time" may be set in advance as the time required for $CO_2$ to replace the non-$CO_2$ gas in the adsorbers 12 and 19 and the discharge channels 101$a$ and 101$b$.

When it is determined in the determination processing of S35 that the lapse time from the start of the desorption preparation mode has reached the predetermined time, the second gas supply section 15 is operated so that the gas flows in the forward flow direction in the processing of S36. In such manner, the first adsorber 12 shifts from the desorption preparation mode to the desorption mode. The first adsorber 12 desorbs the adsorbed $CO_2$ by shifting to the desorption mode. $CO_2$ desorbed from the first adsorber 12 is supplied to the storage section 16 as a desorbed gas through the first discharge channel 101$a$ and the recovery channel 103, and is stored in the storage section 16.

In the fifth embodiment described above, the desorption preparation mode shifts to the desorption mode when the lapse time from the start of the desorption preparation mode reaches the predetermined time. In such manner, it is possible to avoid recovering of $CO_2$ with a predetermined concentration or less, thereby increasing the concentration of $CO_2$ to be recovered.

Further, in the fifth embodiment, the desorption preparation mode shifts to the desorption mode based on the lapse time from the start of the desorption mode. Therefore, it is not necessary to provide the gas concentration sensors 26 and 27, and the configuration can be simplified.

Sixth Embodiment

Next, the sixth embodiment of the present disclosure is described. Hereinafter, only portions different from the above-described embodiments are described.

Figure 13:
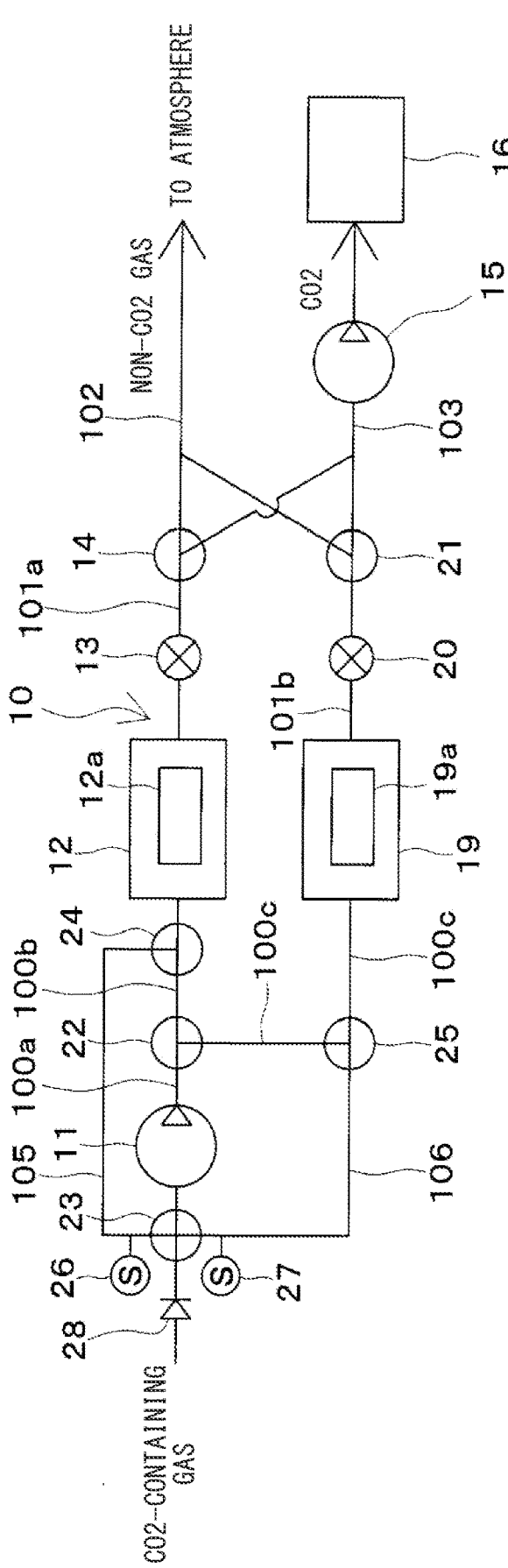
FIG. 13 is a diagram showing a configuration of a carbon dioxide recovery system according to a sixth embodiment.

As shown in FIG. 13, in the carbon dioxide recovery system of the sixth embodiment, a check valve 28 is provided in an upstream portion of the fourth channel switch valve 23 in the first supply channel 100$a$. The check valve 28 is provided in an upstream portion of a merge point where the discharged gas discharged from the adsorbers 12 and 19 merges with the supply gas via the bypass channels 105 and 106. The carbon dioxide recovery system of the sixth embodiment has the same configuration as that of the third embodiment except for the check valve 28.

The check valve 28 allows the gas to pass therethrough when flowing along the flow of the supply gas, and does not allow the gas to pass therethrough when flowing against the flow of the supply gas. Therefore, when the fourth channel switch valve 23 allows communication between the first bypass channel 105 and the first supply channel 100a, the discharged gas that merges from the first bypass channel 105 to the first supply channel 100a can be prevented from flowing in the direction opposite to the flow direction of the supply gas. Similarly, when the fourth channel switch valve 23 allows communication between the second bypass channel 106 and the first supply channel 100a, the discharged gas that merges from the second bypass channel 106 to the first supply channel 100a can be prevented from flowing in the direction opposite to the flow direction of the supply gas.

In the sixth embodiment described above, the check valve 28 is provided in an upstream portion of the fourth channel switch valve 23 in the first supply channel 100a. In such manner, the discharged gas that merges from the first bypass channel 105 and the second bypass channel 106 to the first supply channel 100a can be reliably supplied to the adsorbers 12 and 19, and $CO_2$ contained in the discharged gas can be adsorbed by the adsorbers 12 and 19. In such manner, the recovery rate of $CO_2$ can be improved.

Seventh Embodiment

Next, the seventh embodiment of the present disclosure is described. Hereinafter, only portions different from the above-described embodiments are described.

Figure 14:
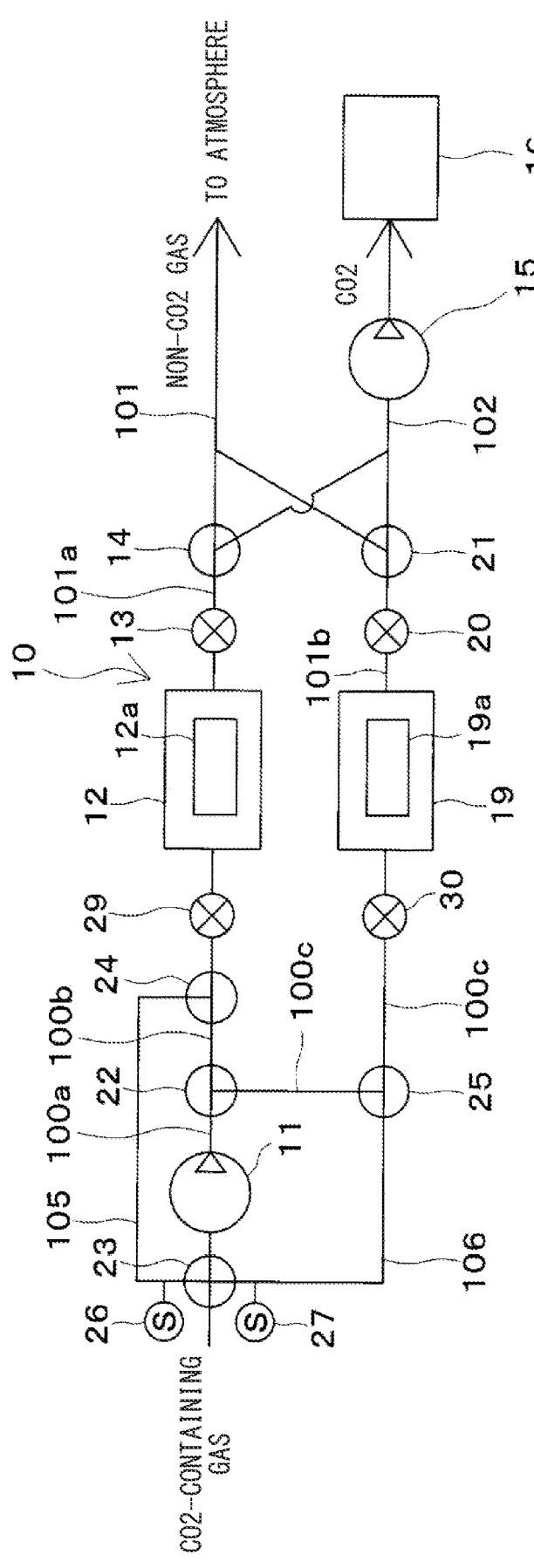
FIG. 14 is a diagram showing a configuration of a carbon dioxide recovery system according to a seventh embodiment.

As shown in FIG. 14, in the carbon dioxide recovery system of the seventh embodiment, throttle valves 29 and 30 are provided downstream in the flow direction of the discharged gas in the adsorbers 12 and 19. Here, the downstream portion in the flow direction of the discharged gas is the downstream portion in the reverse flow direction. The carbon dioxide recovery system of the seventh embodiment has the same configuration as that of the third embodiment except for the throttle valves 29 and 30. In addition, the throttle valves 29 and 30 are used as a part of a pressure adjustment section that adjusts the $CO_2$ partial pressure inside the adsorbers 12 and 19.

The third throttle valve 29 is provided in a downstream portion of the first adsorber 12 in the flow direction of the discharged gas. The third throttle valve 29 is provided between the fifth channel switch valve 24 and the first adsorber 12 in the second supply channel 100b. The third throttle valve 29 may be provided at any position, as long as the position is in a gas channel in a downstream portion of the discharged gas flow direction of the first adsorber 12, which may be in the first bypass channel 105.

The fourth throttle valve 30 is provided in a downstream portion of the second adsorber 19 in the flow direction of the discharged gas. The fourth throttle valve 30 is provided at a position between the sixth channel switch valve 25 and the second adsorber 19 in the third supply channel 100c. The fourth throttle valve 30 may be provided at any position, as long as the position is in the gas channel in a downstream portion of the second adsorber 19 in the flow direction of the discharged gas, which may be in the second bypass channel 106.

The third throttle valve 29 reduces the valve opening degree when $CO_2$ is supplied to the first adsorber 12 by the second gas supply section 15, and increase the valve opening degree when the supply gas is supplied to the first adsorber 12 by the first gas supply section 11. The second throttle valve 30 reduces the valve opening degree when the second gas supply section 15 supplies $CO_2$ to the second adsorber 19, and increases the valve opening degree when the supply gas is supplied to the second adsorber 19 by the first gas supply section 11.

According to the seventh embodiment described above, when $CO_2$ is supplied to the adsorbers 12 and 19 by the second gas supply section 15 in the desorption preparation mode, the opening degrees of the throttle valves 29 and 30 are reduced. In such manner, when the non-$CO_2$ gas in the adsorbers 12 and 19 is replaced with $CO_2$ in the desorption preparation mode, the $CO_2$ partial pressure inside the adsorbers 12 and 19 can be increased. In such manner, it is possible to suppress the desorption of $CO_2$ from the adsorbers 12 and 19 in the desorption preparation mode, thereby improving the recovery rate of $CO_2$.

The present disclosure is not limited to the embodiments described above, and various modifications can be made as follows within a range not departing from the spirit of the present disclosure. Further, the means disclosed in each of the above-described embodiments may be appropriately combined to the extent practicable.

For example, in each of the above-described embodiments, the example using the adsorbers 12 and 19 that adsorb and desorb $CO_2$ according to the $CO_2$ partial pressure difference has been described. However, different types of adsorbers may also be used. For example, an adsorber that adsorbs and desorbs $CO_2$ by a temperature difference may also be used, or an adsorber consisting of an electrochemical cell that adsorbs and desorbs $CO_2$ by a voltage difference applied between electrodes may also be used.

In addition, in the sixth embodiment described above, the check valve 28 is provided in the first supply channel 100a in the configuration in which the adsorption mode is alternately executed by the plurality of adsorbers 12 and 19. However, the check valve 28 may also be provided in the configuration of the second embodiment in which one adsorber 12 is provided. In such case, in the supply channel 100, a check valve may be provided in the upstream portion in the flow direction of the supply gas from the merge point where the discharged gas merges via the auxiliary channel switch valve. In such manner, the discharged gas discharged from the adsorber 12 can be reliably supplied to the auxiliary storage section 17 in the desorption preparation mode, and the discharged gas stored in the auxiliary storage section 17 can be reliably supplied to the adsorber 12 in the adsorption mode. In such manner, the recovery rate of $CO_2$ can be improved.

Further, in the seventh embodiment, in the configuration in which a plurality of adsorbers 12 and 19 are provided, the throttle valves 29 and 30 are provided upstream in the flow direction of the supply gas in the adsorbers 12 and 19. However, in the configuration in which one adsorber 12 is provided, a throttle valve may be provided upstream in the flow direction of the supply gas in the adsorber 12.

In addition, in the above-described third embodiment, in the configuration in which a plurality of adsorbers 12 and 19 are provided, the shift to the desorption mode is made based on the $CO_2$ concentration. However, in the configuration in which one adsorber 12 is provided, the shift to the desorption mode may also be made based on the $CO_2$ concentration.

In addition, in the fourth embodiment described above, in the configuration in which a plurality of adsorbers 12 and 19 are provided, the shift to the desorption mode is made based on the non-$CO_2$ gas concentration. However, in the configuration in which one adsorber 12 is provided, the shift to the desorption mode may also be made based on the non-$CO_2$ gas concentration.

In addition, in the above-described fifth embodiment, in the configuration in which a plurality of adsorbers 12 and 19 are provided, the shift to the desorption mode is made based on the lapse time from the start of the desorption preparation mode. However, the shift to the desorption mode may also be made based on the lapse time from the start of the desorption preparation mode.

Further, in the third to seventh embodiments, the carbon dioxide recovery system provided with two adsorbers 12 and 19 has been described. However, three or more adsorbers may also be provided. For example, when three adsorbers are provided, one adsorber may be operated in the adsorption mode, and two adsorbers may be operated in the desorption preparation mode and the desorption mode.

Further, in the third embodiment, the discharged gas discharged from the adsorbers 12 and 19 in the desorption preparation mode is supplied to the adsorbers 12 and 19 in the adsorption mode. Alternatively, the discharged gas may be discharged to the atmosphere without supplying to the adsorbers 12 and 19 in the adsorption mode. In such case, an atmosphere release valve communicating with the atmosphere may be provided in the gas channel through which the discharged gas passes.

Although the present disclosure has been described in accordance with examples, it is understood that the present disclosure is not limited to those examples and configurations. The present disclosure covers various modifications and equivalent arrangements. In addition, while the various elements are shown in various combinations and configurations, which are exemplary, other combinations and configurations, including one or more elements, or one-less element or further, are also within the spirit and scope of the present disclosure.

What is claimed is:

1. A carbon dioxide recovery system for separating and recovering $CO_2$ from a supply gas containing $CO_2$ and non-$CO_2$ gas other than $CO_2$, the carbon dioxide recovery system comprising:

an adsorber configured to adsorb or desorb $CO_2$;

a supply channel through which the supply gas passes;

a storage section configured to store $CO_2$ desorbed from the adsorber;

a gas supply section configured to supply $CO_2$ stored in the storage section to the adsorber; and a throttle valve provided in the supply channel, wherein the carbon dioxide recovery system is configured to set:

an adsorption mode in which the adsorber adsorbs $CO_2$ contained in the supply gas supplied through the supply channel;

a desorption mode in which $CO_2$ adsorbed by the adsorber is desorbed and the storage section stores the desorbed $CO_2$ desorbed from the adsorber; and a desorption preparation mode in which the gas supply section supplies $CO_2$ stored in the storage section to the adsorber, during a period from an end of the adsorption mode to a start of the desorption mode, wherein during the desorption preparation mode, the throttle valve has a smaller opening degree than an opening degree in the adsorption mode, and the throttle valve is located downstream of the adsorber in a flow direction of the gas when $CO_2$ stored in the storage section is supplied to the adsorber in the desorption preparation mode.

2. The carbon dioxide recovery system according to claim 1, wherein the adsorber is configured to adsorb or desorb $CO_2$ in accordance with a variation in a $CO_2$ partial pressure inside the adsorber, the carbon dioxide recovery system further comprising a pressure adjuster configured to adjust the $CO_2$ partial pressure inside the adsorber, and the pressure adjuster adjusts the $CO_2$ partial pressure inside the adsorber to a predetermined pressure in order to cause the adsorber to adsorb $CO_2$ in the adsorption mode, and to adjust the $CO_2$ partial pressure inside the adsorber to be lower than the predetermined pressure in order to cause the adsorber to desorb $CO_2$.

3. The carbon dioxide recovery system according to claim 1, further comprising:

an auxiliary storage section configured to store discharged gas discharged from the adsorber when the $CO_2$ is supplied by the gas supply section in the desorption preparation mode, wherein the auxiliary storage section is configured to cause the discharged gas stored in the auxiliary storage section to merge with the supply gas and is supplied to the adsorber in the adsorption mode.

4. The carbon dioxide recovery system according to claim 1, wherein a plurality of the adsorbers are provided, when a specific adsorber operates in the adsorption mode, the other adsorber other than the specific adsorber operates in the desorption preparation mode or the desorption mode, and a discharged gas, discharged from the other adsorber operating in the desorption preparation mode along with a supply of $CO_2$ by the gas supply section, is mixed with the supply gas and joins the specific adsorber operating in the adsorption mode.

5. The carbon dioxide recovery system according to claim 3, further comprising:

a check valve provided upstream in a flow direction of the supply gas from a merge point where the discharged gas merges with the supply gas in the supply channel, and the check valve is configured to allow the gas flowing along the flow of the supply gas to pass therethrough, and to shut a flow of the gas flowing against the flow of the supply gas.

6. The carbon dioxide recovery system according to claim 1, wherein the desorption mode is performed for an execution time that is longer than an execution time of the desorption preparation mode.

7. A carbon dioxide recovery system for separating and recovering $CO_2$ from a supply gas containing $CO_2$ and non-$CO_2$ gas other than $CO_2$, the carbon dioxide recovery system comprising:

an adsorber configured to adsorb or desorb $CO_2$;

a supply channel through which the supply gas passes;

a storage tank configured to store $CO_2$ desorbed from the adsorber;

a gas supply device configured to supply $CO_2$ stored in the storage section to the adsorber;

a throttle valve provided in the supply channel; and a controller configured to switch an operation mode, among an adsorption mode in which the adsorber adsorbs $CO_2$ contained in the supply gas supplied through the supply channel, a desorption mode in which $CO_2$ adsorbed by the adsorber is desorbed and the storage tank stores therein the desorbed $CO_2$ desorbed from the adsorber, and a desorption preparation mode in which the gas supply device supplies $CO_2$ stored in the storage tank to the adsorber during a period from an end of the adsorption mode to a start of the desorption mode, wherein during the desorption preparation mode, the throttle valve has a smaller opening degree than an opening degree in the adsorption mode, wherein the controller controls the gas supply device to switch the desorption mode from the desorption preparation mode, in response to a result in which the controller determines that a predetermined condition is satisfied, and the throttle valve is located downstream of the adsorber in a flow direction of the gas when $CO_2$ stored in the storage section is supplied to the adsorber in the desorption preparation mode.

8. The carbon dioxide recovery system according to claim 7, further comprising:

a gas concentration sensor configured to detect a $CO_2$ concentration of the discharged gas discharged from the adsorber along with the supply of $CO_2$ by the gas supply section in the desorption preparation mode, wherein the controller controls the gas supply device to switch the desorption mode from the desorption preparation mode, in response to a result in which the controller determines that the $CO_2$ concentration detected by the gas concentration sensor reaches or exceeds a predetermined concentration in the desorption preparation mode.

9. The carbon dioxide recovery system according to claim 7, further comprising:

a gas concentration sensor configured to detect a non-$CO_2$ gas concentration of the discharged gas discharged from the adsorber along with the supply of $CO_2$ by the gas supply section in the desorption preparation mode, wherein the controller controls the gas supply device to switch the desorption mode from the desorption preparation mode, in response to a result in which the controller determines that the non-$CO_2$ gas concentration detected by the gas concentration sensor becomes below a predetermined concentration.

10. The carbon dioxide recovery system according to claim 7, wherein the controller controls the gas supply device to switch the desorption mode from the desorption preparation mode, in response to a result in which the controller determines that a lapse time from the start of the desorption preparation mode reaches a predetermined time.

11. The carbon dioxide recovery system according to claim 10, wherein upon transition to the desorption mode, the controller controls the gas supply device to lower the $CO_2$ partial pressure in the adsorber compared to the adsorption mode, and supplies the $CO_2$ desorbed from the adsorber to the storage section.

\* \* \* \* \*